United States Patent
Douglas, Sr.

(10) Patent No.: US 8,709,259 B2
(45) Date of Patent: Apr. 29, 2014

(54) METHOD FOR TREATING A VARIETY OF WASTEWATER STREAMS

(76) Inventor: Frederick Douglas, Sr., Pittsburgh, PA (US)

(*) Notice: Subject to any disclaimer, the term of this patent is extended or adjusted under 35 U.S.C. 154(b) by 0 days.

(21) Appl. No.: 13/991,353

(22) PCT Filed: Dec. 2, 2011

(86) PCT No.: PCT/US2011/063055
§ 371 (c)(1),
(2), (4) Date: Jul. 17, 2013

(87) PCT Pub. No.: WO2012/075389
PCT Pub. Date: Jun. 7, 2012

(65) Prior Publication Data
US 2013/0292336 A1 Nov. 7, 2013

Related U.S. Application Data

(60) Provisional application No. 61/458,841, filed on Dec. 2, 2010.

(51) Int. Cl.
*C02F 9/00* (2006.01)

(52) U.S. Cl.
USPC ........... 210/721; 210/665; 210/669; 210/673; 210/684

(58) Field of Classification Search
USPC ...................................................... 210/721
See application file for complete search history.

(56) References Cited

U.S. PATENT DOCUMENTS

| | | |
|---|---|---|
| 5,350,522 A | 9/1994 | Fyson |
| 5,840,194 A | 11/1998 | Yokose et al. |
| 6,143,182 A | 11/2000 | Huang et al. |
| 2002/0115899 A1 | 8/2002 | Stanforth |
| 2002/0148790 A1 | 10/2002 | Krulik |

OTHER PUBLICATIONS

International Search Report and Written Opinion for International Application No. PCT/US2011/063055 dated Jul. 27, 2012.

*Primary Examiner* — Tony G Soohoo
*Assistant Examiner* — Peter Keyworth
(74) *Attorney, Agent, or Firm* — David G. Oberdick; Peter J. Borghetti

(57) ABSTRACT

The present invention is a wastewater treatment method using dried BOF slag and hydrogen peroxide, wherein hydrogen peroxide is oxidized to generate hydroxyl radicals that reacts with soluble metal contaminants in the sludge such that these contaminants can be adsorb on the catalyst particles and/or eliminated from the wastewater stream by separation techniques. The process can use catalytic oxidation for soluble metals removal. In addition, catalytic oxidation can produce a filtered water saturated with Oxygen and higher in pH resulting in enhanced precipitation of soluble metals when softening agents, such as Sodium Carbonate, are added in a subsequent processing step. Another embodiment of the present invention is a method using ferrous sulfate for removing soluble metals in wastewater, followed by Catalytic Oxidation to remove soluble Fe without addition of metal salts, and removing sulfates by adding Barium Carbonate.

42 Claims, 5 Drawing Sheets

METHOD FOR TREATING A VARIETY OF WASTEWATER STREAMS

CROSS REFERENCE TO RELATED APPLICATIONS

This application is a U.S. National Stage application under 35 USC 371 filing of International Application Number PCT/US2011/063055, entitled "METHOD FOR TREATING A VARIETY OF WASTEWATER STREAMS" filed on Dec. 2, 2011, which claims priority from U.S. Provisional Application Ser. No. 61/458,841, entitled METHOD FOR TREATING A VARIETY OF WASTEWATER STREAMS USING A SOLID METAL OXIDE BY-PRODUCT STREAM filed on Dec. 2, 2010, both are incorporated herein by reference.

FIELD OF THE INVENTION

The present invention is related generally to a method of treating a wastewater stream and, more particularly, to a method of treating a wastewater stream containing metals, organics, suspended solids, sulfates and other contaminants.

BACKGROUND OF THE INVENTION

The Marcellus Shale is a sedimentary rock formation deposited over 350 million years ago in a shallow inland sea located in the eastern United States where the present-day Appalachian Mountains now stand. This shale contains significant quantities of natural gas. New developments in drilling technology, along with higher wellhead prices, have made the Marcellus Shale an important natural gas resource.

In the new hydrofracturing process, high pressure water is forced into the well during the drilling process to break up the shale deposit and release natural gas. This process typically requires from two (2) to seven (7) million gallons (MG) of water to frac a well (drill using high pressure water), and additional 0.1 to one (1) million gallons of water needed for drilling fluids to maintain down-hole hydrostatic pressure, cool the drill head and enable removal of drill cuttings. Approximately twenty to twenty-five percent (20 to 25%) of this water, an average of 1.2 MG, returns to the surface with the natural gas. The return water is heavily contaminated with metals, for example, Barium (Ba), Strontium (Sr), Magnesium (Mg), Calcium (Ca), and Iron (Fe), and in some cases radionuclides. This return wastewater is generated in two (2) stages: i) the first stage is flowback water that returns to the surface with natural gas in one (1) to three (3) weeks after the gas production starts; and ii) the second stage is produced water which continues to flow approximately three (3) weeks after gas production starts, and continues over the life of the well, approximately six (6) years. Usually, approximately twenty-one percent (21%), used in the drilling process returns to the surface as flowback water, approximately 1.06 MG. This frac (frac and produced) water, in addition to the frac fluids added by the gas drilling companies, contain a variety of contaminants such as total dissolved solids, heavy metals, organics and possibly radionuclides. This combination of contaminants can make frac water difficult and expensive to treat. Most of the total dissolved solids (TDS) in flowback water and produced water is due to sodium chloride, and on average, is three (3) to five (5) times saltier than sea water. TABLE A shows the constituents and concentration ranges usually found in untreated samples of frac water.

TABLE A

| Sr. No. | Analyte | Analyte Concentration Ranges (mg/L) |
|---|---|---|
| 1. | pH | 3.5-6.5 |
| 2. | Iron (Fe) | 10-150 |
| 3. | Barium (Ba) | 25-4,000 |
| 4. | Sulfate ($SO_4$) | 5-400 |
| 5. | Chloride (Cl) | 10,000-150,000 |
| 6. | Sodium (Na) | 10,000-50,000 |
| 7. | Strontium (Sr) | 100-3,000 |
| 8. | Total Dissolved Solids (TDS) | 15,000-250,000 |
| 9. | Calcium (Ca) | 500-20,000 |
| 10. | Magnesium (Mg) | 100-3,000 |
| 11. | Total Suspended Solids (TSS) | 100-1,500 |

The above-mentioned frac water must be treated and disposed of properly. Some of the current disposal practices for frac water include: (1) storing the frac water in large ponds and tanks and reusing after being blended with clean water; (2) loading the frac water into trucks/trailers and sending/transporting it to external centralized treatment facilities for disposal or disposing in underground deep-well injection wells; and (3) treating the frac water on-site by means of known on-site treatment technologies such as Evaporation, Crystallization, Distillation, and/or multiple selective precipitation steps of five (5) or more stages, etc. Traditional treatment techniques such as evaporation and selective precipitation appear not to be economically feasible options for treating Marcellus shale wastewater.

The various wastewater treatment methods for treating Marcellus shale frac water is generally costly with higher energy consumptions, and the effectiveness and efficiency at removing the contaminants is not very good. Further, because the amount of gas wells in the Marcellus shale area are increasing at a substantial rate, there is a need in the industry to find an effective and cost efficient way to treat frac water generated from gas production.

It is advantageous to provide a cost-efficient, portable and effective process that treats frac water streams containing waste metal elements and/or compounds using a by-product such as BOF sludge generated during steel production. The advantages of this wastewater treatment process include, but not limited to, significant metals reduction, recovery and reuse of regenerated BOF sludge as a catalyst, breakdown of organic compounds including recalcitrant organic compounds, and the use of readily available equipment components that do not require specialty materials and fabrication techniques.

The gas companies vary as to the water quality suitable for drilling purposes. A suitable frac water treatment process does not necessarily have to meet "the water quality suitable for drilling," if after adding fresh water the final water quality meets the drilling standards for the client. Generally, treated water available for drilling is approximately $\frac{1}{3}^{rd}$ of the total volume required. Therefore, any final treated water quality can be three (3) times higher than the acceptable limits and be accepted for recycling, since dilution will bring the water quality into the acceptable range.

The following is an example of a water quality acceptable for recycling after treatment by a Major Gas Producer.

TABLE B

| Sr. No. | Analyte | Units | Analyte Concentration |
|---|---|---|---|
| 1. | pH | — | 6.0-8.5 |
| 2. | Iron (Fe) | mg/L | 0.3-4.0 |

TABLE B-continued

| Sr. No. | Analyte | Units | Analyte Concentration |
|---|---|---|---|
| 3. | Barium ($Ba^{2+}$) | mg/L | 163-200 |
| 4. | Strontium ($Sr^{2+}$) | mg/L | 323-377 |
| 5. | Calcium ($Ca^{2+}$) | mg/L | 226-350 |
| 6. | Magnesium ($Mg^{2+}$) | mg/L | 595-700 |
| 7. | Sodium ($Na^+$) | mg/L | 35,050-50,000 |
| 8. | Potassium ($K^+$) | mg/L | 966-1,529 |
| 9. | Chloride ($Cl^-$) | mg/L | 55,400-65,000 |
| 10. | Sulfate ($SO_4^{2-}$) | mg/L | 0-200 |
| 11. | Hardness | mg/L as $CaCO_3$ | 3,003-3,260 |
| 12. | Total Suspended Solids (TSS) | mg/L | 138-245 |

SUMMARY OF THE INVENTION

Hydrogen Peroxide ($H_2O_2$) is a powerful oxidant, but at low concentrations (<0.1%) its reaction kinetics are too slow to degrade many contaminants of concern. The present invention proposes to use a mix of catalytic oxidation to generate the (OH.) free radical, resulting in the adsorption of aqueous metal contaminants on the surface of the catalyst and sodium carbonate and other chemical precipitation techniques. Dried Basic Oxygen Furnace (BOF) sludge or slag is used to catalyze ($H_2O_2$).

BOF sludge (sludge and slag are interchangeably used herein) used in this experiment has submicron particles in the nano-range. The extremely fine submicron particles mimic the behavior of soluble $Fe^{3+}$ and $Fe^{2+}$ in catalyzing the breakdown of hydrogen peroxide. The present invention uses BOF sludge in the presence of hydrogen peroxide to remove metals, as well as organics, in wastewater streams such as wastewater generated during the drilling for natural gas in the Marcellus shale (frac water), which is unique in that catalytic oxidation is used principally to remove metals and not necessarily organics from wastewater such as frac water. In addition, the present invention uses catalytic oxidation in a synergistic role to remove metals, namely iron (Fe) in the catalytic step while producing "conditioned" wastewater; such that, when the partially treated water from the first step is transferred to a second in which sodium carbonate ($Na_2CO_3$) is added, precipitation of multiple metals (Ba, Ca and Sr), at large percentage removal, is achieved at a narrow pH range between 6.0 and 8.5. "Wastewater conditioning" is the result of the following process: performing a First Process Step of catalytic oxidation, as shown in FIG. 1, increases the overall efficiency of metal removals in the Second Processing Step (filtered pre-treated water from the First Processing Step). The catalyst used initiates and maintains reactive in the Second Processing Step which creates a strong oxidation-reduction environment in the Second Processing Step. This leaching of basicity, the existence of an enhanced oxidation-reduction environment in the catalytic oxidation step resulting from metals such as $Fe^{2+}$ undergoing oxidation to $Fe^{3+}$ and vice versa shown below:

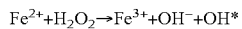

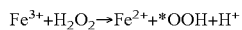

The oxygenation of the water caused by the sum of the reactions generating oxygen ($O_2$) resulting in $O_2$ saturated water leaving the First Processing Step enhance the bulk precipitation of cations ($Ca^{2+}$, $Ba^{2+}$, and $Sr^{2+}$) by $Na_2CO_3$ precipitation. The water leaving the catalytic oxidation step continues to degas and effervesce even after the catalyst particles are filtered. Catalytic oxidation continues in the oxygen ($O_2$) rich water in the Second Processing Step due to the presence of minutes amounts of submicron metal oxide particles possibly in the nano-particle range continuing to undergo Fenton-like reactions and forming submicron metal hydroxides polymer chains.

In basic oxygen steel making, molten iron from a blast furnace is charged into a basic oxide furnace (BOF), which is used for the final refinement of the iron into steel. BOF slag is one type of pollutant waste or by-product resulting from the different steps in steel production. The BOF sludge is typically disposed of by landfilling. Very limited efforts have been made in recycling BOF slag.

BOF slag can be used by adding hydrogen peroxide ($H_2O_2$) wherein the hydrogen peroxide ($H_2O_2$) is oxidize to generate hydroxyl radicals (OH.) as discussed above, which in turn reacts with metals contaminants, as well as organics, in the sludge such that these contaminants can be oxidized. An example of a BOF Sludge composition is provided below in Table C.

TABLE C

| Composition | Formulas | Weight % |
|---|---|---|
| Fe-rich | FeO, $Fe_2O_3$, $Fe_3O_4$ | 6-48 |
| Fe/Zn-rich | ZnO, $ZnFe_2O_4$ | 5-30 |
| Ca/Fe-rich | CaO, $CaFe_2O_4$ | 5-20 |
| Fe/Mg-rich | $MgFe_2O_4$ | 2-8 |
| Si/Mg-rich | $SiMg_2O_2$ | 2-8 |
| Ca-rich | CaO | 3-52 |
| Si-rich | SiO | 0.5-16 |

The present invention provides for a method of treating a wastewater stream using BOF slag and hydrogen peroxide ($H_2O_2$) wherein the hydrogen peroxide ($H_2O_2$) is oxidize to generate hydroxyl radicals (OH.) in a Fenton-like reaction which, in turn, reacts with metal contaminants in the sludge forming hydroxides such that these contaminants can be further adsorb on the BOF sludge particles and subsequently eliminated from the wastewater stream by separation techniques known in the art.

The present invention also provides for a method of treating a wastewater stream containing soluble iron (Fe) or barium (Ba) to remove the Fe or Ba from such a stream.

The present invention provides for a method to condition the frac water in the first catalytic oxidation step such that when this step is followed by carbonate precipitation and other similar precipitation techniques known in the art, the efficiency of removal of the mixed metals divalent cations is enhanced.

The present invention also provides a method for using Ferrous Sulfate, given sulfates effectiveness in forming insoluble salts with divalent cations, while providing a method for Barium addition, which would scavenge residual sulfates and precipitate the sulfate as barium sulfate while keeping the barium to acceptable levels in the treated frac water, thus meeting the acceptable water criteria discussed.

The present invention is capable of meeting the water quality by achieving significant reductions in the scale forming chemicals concentration within the limits specified above. The present invention produces treated water that meets the desired Sodium (Na+), Chloride (Cl−) (salt) and Sulfate ($SO_4^{2-}$) concentrations by diluting the treated frac water with fresh make-up water required to meet the total water volume required to drill a well.

BRIEF DESCRIPTION OF THE DRAWINGS

For the present invention to be easily understood and readily practiced, the invention will now be described, for the purposes of illustration and not limitation, in conjunction with the following figure, wherein.

DETAILED DESCRIPTION OF THE INVENTION

The present invention will be illustrated with examples of wastewater treatment processes, and it is not intended to limit the present invention to disclosed embodiments.

Figure 1:
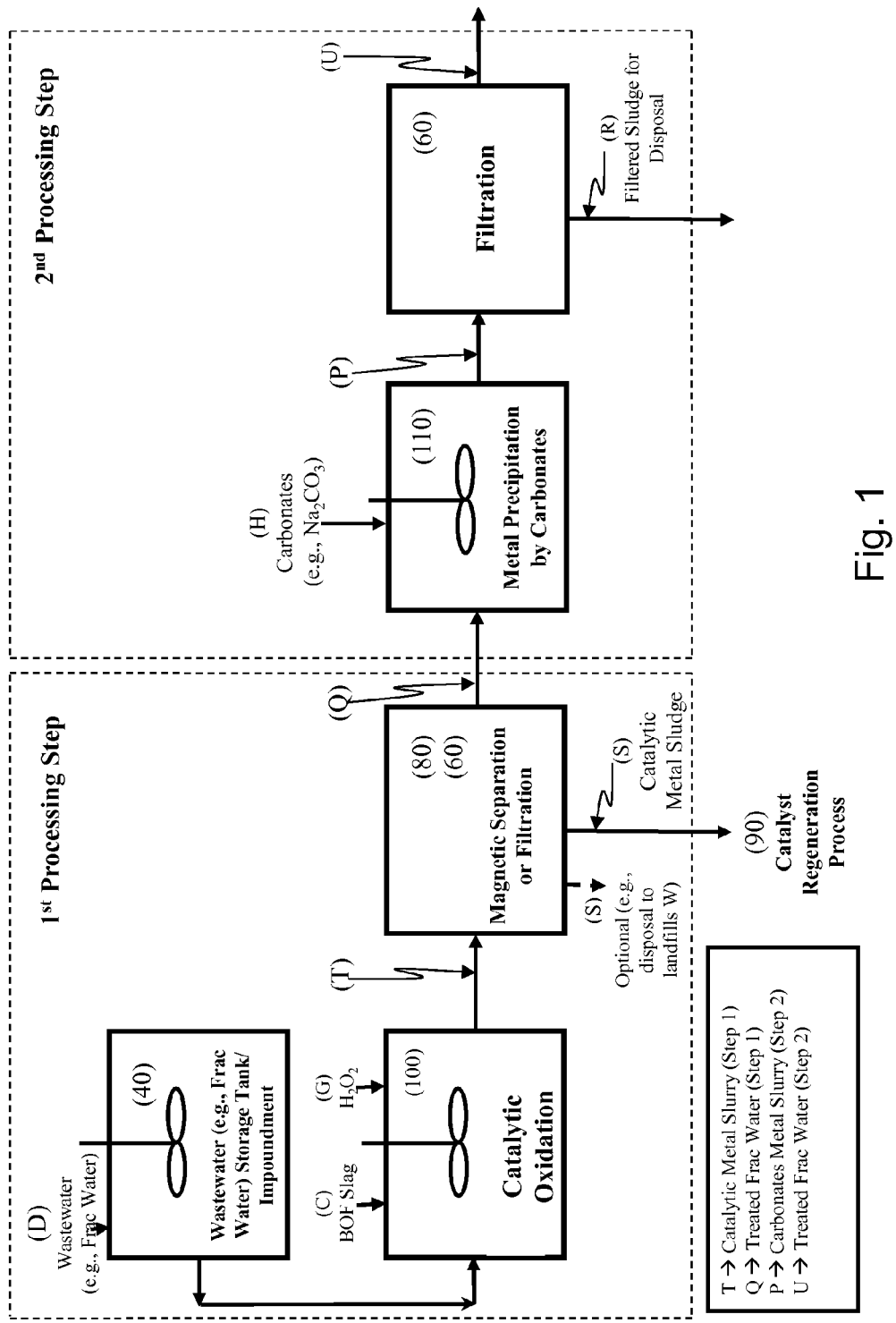
FIG. 1 is an illustration of one embodiment of the present invention including a two-step process for treating Frac Water, wherein the first processing step is Catalytic Oxidation followed by Magnetic Separation or Filtration, and the second processing step is Metal Precipitation by Carbonate(s) (e.g., $Na_2CO_3$) followed by Filtration.

Now turning to FIG. 1 that shows two (2) processing steps for treating frac water. Each of these processing steps consists of two (2) unit operations.

In the first processing step, the first unit operation is catalytic oxidation 100. In this unit operation, the wastewater D (e.g., frac water) is added to the Catalytic Oxidation Tank/Reactor 100 from the wastewater storage tank/impoundment 40 followed by adding measured amounts of dried BOF Slag (Catalyst) C (Catalyst to Frac Water ratio=1-300 g/L), and Hydrogen Peroxide G (to produce a 0.1-2.0 M solution). After that, the mixture is stirred continuously. The Catalytic Oxidation unit operation 100 produces reactions because of the reaction between Iron (Fe) particles in the BOF Slag (Catalyst) C and Hydrogen Peroxide G. This reaction generates the hydroxyl free radicals (OH.), which is capable of oxidizing organics, metals, and possibly radionuclides. One embodiment of the removal mechanism for this unit operation is a combination of chemical and electrolytic mechanisms: catalytic oxidation, colloidal co-precipitation and metals adsorption onto the catalyst (BOF Slag particles) surface. The Catalytic Metal Slurry T is then transferred to physical separation processes such as magnetic separation unit 80 or filtration unit 60 (e.g. Ultrafiltration, Microfiltration, Reverse Osmosis and other types of filters known in the art). The typical reaction time for this unit operation is thirty (30) minutes to three (3) hours.

In the first processing step, the second unit operation is a physical separation unit such as a magnetic separation 80 or filtration 60. In this unit operation, the catalytic metal slurry T from the catalytic oxidation tank/reactor 100 is pumped or gravity fed to the magnetic separation unit 80 or filtration unit 60 (e.g. Ultrafiltration, Microfiltration, Reverse Osmosis and other types of filters known in the art). These physical separation units separate the treated frac water Q from the catalytic metal slurry T and produce a catalytic metal sludge S. The water recovery for this unit operation is 80 to 90%. This catalytic metal sludge S can then be either disposed in a secured landfill W or recycled in a catalyst regeneration process 90. The treated frac water Q contains lower amounts of Iron (Fe), Barium (Ba), and Total Suspended Solids (TSS).

In the second processing step, the first unit operation is metal precipitation by Carbonate(s) 110. In this unit operation, the treated frac water from first processing step Q is added to the Metal Precipitation Tank/Reactor 110 followed by adding measured amounts of Carbonate(s) (e.g., $Na_2CO_3$) (H) ($Na_2CO_3$ to Frac Water ratio=1-100 g/L). After that, the mixture is stirred continuously. Carbonate(s) addition precipitate divalent metals such as Barium, Strontium, Calcium, Magnesium and other metals as insoluble metals salts (i.e., barium carbonate, strontium carbonate, calcium carbonate, magnesium carbonate, etc.). The typical reaction time for this unit operation is thirty (30) minutes to one (1) hour. After the metal precipitation unit operation is complete, the carbonate metal slurry P is transferred to a physical separation unit such as a Filtration unit 60.

In the second processing step, the second unit operation is filtration 60. In this unit operation, the carbonate metal slurry P from the metal precipitation tank/reactor 110 is pumped or gravity fed to the filtration unit 60 (e.g. Ultrafiltration, Microfiltration, Reverse Osmosis and other types of filters known in the art). These filtration units separate treated frac water U from the slurry and produce a filtered sludge R. The water recovery for this unit operation is 85 to 95%. The filtered sludge (R) can then be disposed in a secured landfill. The treated frac water (U) contains lower amounts of Iron (Fe), Barium (Ba), Calcium (Ca), Magnesium (Mg), Strontium (Sr), Sulfate ($SO_4$), Total Suspended Solids (TSS), and Hardness (as $CaCO_3$) than the wastewater, such as frac water.

One embodiment of this present invention includes a composition for the first ($1^{st}$) Processing Step—Catalytic Oxidation followed by Magnetic Separation or Filtration Catalyst to include Frac Water ratio=1-300 g/L, $H_2O_2$ Concentration=0.1-2 M solution, and Catalyst to $H_2O_2$ (100%) ratio=0.25-7 g/g; and the second ($2^{nd}$) Processing Step—Metal Precipitation by Carbonate(s) (e.g., $Na_2CO_3$) followed by Filtration to include $Na_2CO_3$ to Frac Water ratio=1-100 g/L.

Another embodiment of this present invention includes a composition for the first ($1^{st}$) Processing Step—Catalytic Oxidation followed by Magnetic Separation or Filtration Catalyst to include Catalyst to Frac Water ratio=20-30 g/L, $H_2O_2$ Concentration=3-7 M solution, and Catalyst to $H_2O_2$* (100%) ratio=5.3-7.5 g/g; and the second ($2^{nd}$) Processing Step—Metal Precipitation by Carbonate(s) (e.g., $Na_2CO_3$) followed by Filtration to include $Na_2CO_3$ to Frac Water ratio=40-45 g/L.

The values of concentration of catalyst and $H_2O_2$ shown above are high are used when high Barium removal levels are not achieved with lower levels of concentrations as used in Process 1 (Table I, II, III and IV) to achieve high barium removal (more than 95%) in $2^{nd}$ processing step (see Table I, II, III, and IV).

1. Volume of Treated Frac Water (Q) from $1^{st}$ processing step=570 mL
2. Reaction time ($\tau$)=38 min (0.63 hour)
3. Filtered Sludge (S)=74 gm
4. Treated Frac Water (U)=520 mL Note: In this unit operation, 570 mL was used from Treated Frac Water (Q). The remaining water was used for water testing.

See Table I below for the Experiment Trial 1 Results:

| | | Analyte Concentration (mg/L or ppm) | | | | | |
|---|---|---|---|---|---|---|---|
| | | $1^{st}$ Processing Step Catalyst to Frac Water ratio = 25 g/L $H_2O_2$ conc. = 0.1M solution Catalyst to $H_2O_2$ (100%) ratio = 7 g/g | | | $2^{nd}$ Processing Step $Na_2CO_3$ to Frac Water ratio = 43.22 g/L Treated Frac Water (Step 2) (U) | Analyte Removal (%) | | |
| Sr. No. | Analyte | Untreated Frac Water (D) | Diluted Concentration (Step 1) (Y)* | Treated Frac Water (Step 1) (Q) | | Step 1 $=\dfrac{Y-Q}{Y}\times 100$ | Step 2 $=\dfrac{Q-U}{Q}\times 100$ | Total** $=\dfrac{Y-U}{Y}\times 100$ |
| 1. | pH | 3.77 | — | 6.31 | 8.26 | — | — | — |
| 2. | Calcium | 13,800 | 13,687 | 13,000 | 43 | 5 | 100 | 100 |
| 3. | Iron | 103 | 102 | 5 | 1 | 95 | 80 | 99 |
| 4. | Barium | 451 | 447 | 430 | 5.2 | 4 | 99 | 99 |
| 5. | Strontium | 2,690 | 2,668 | 2,500 | 99 | 6 | 96 | 96 |
| 6. | Hardness | 38,231 | 37,917 | 36,313 | 2,445 | 4 | 93 | 94 |
| 7. | Sulfate | 109 | 108 | 21 | 21 | 81 | 0 | 81 |
| 8. | Zinc | 0.5700 | 0.5653 | 19 | 0.2 | −3,261 | 99 | 65 |
| 9. | TSS | 1,020 | 1,012 | 60 | 102 | 94 | −70 | 90 |
| 10. | Potassium | 3,440 | 3,412 | 2,200 | 2,100 | 36 | 5 | 38 |
| 11. | Magnesium | 910 | 903 | 930 | 570 | −3 | 39 | 37 |
| 12. | Chloride | 145,000 | 143,810 | 89,000 | 110,000 | 38 | −24 | 24 |
| 13. | Lithium | 100 | 99 | 94 | 83 | 5 | 12 | 16 |
| 14. | TDS | 205,000 | 203,318 | 150,000 | 210,000 | 26 | −40 | −3 |
| 15. | Sodium | 46,900 | 46,515 | 48,000 | 60,000 | −3 | −25 | −29 |

*In the $1^{st}$ processing step, adding $H_2O_2$ resulted in a 0.82% dilution factor.

Yet another embodiment for this present invention (see Tables I, II, III, and IV) includes a composition for the first ($1^{st}$) Processing Step—Catalytic Oxidation followed by Magnetic Separation or Filtration Catalyst to include Catalyst to Frac Water ratio=25 g/L, $H_2O_2$ Concentration=0.1M solution, and Catalyst to $H_2O_2$ (100%) ratio=7 g/g; and the second ($2^{nd}$) Processing Step—Metal Precipitation by Carbonate(s) (e.g., $Na_2CO_3$) followed by Filtration to include $Na_2CO_3$ to Frac Water ratio=43.22 g/L.

Experimental trials 1, 2, 3, and 4 of these present invention (two-step unit process) are presented Tables I, II, III, and IV below.

Experimental Trial 1

First ($1^{st}$) Processing Step—Catalytic Oxidation Followed by Magnetic Separation or Filtration:

1. Volume of Frac Water (D)=1,500 mL
2. Reaction time ($\tau$)=1 hour
3. Catalytic Metal Sludge (S)=70 gm
4. Treated Frac Water (Q)=1,470 mL $2^{nd}$ Processing Step—Metal Precipitation by Carbonate(s) (e.g., $Na_2CO_3$) Followed by Filtration:

Experimental Trial 2

First ($1^{st}$) Processing Step—Catalytic Oxidation Followed by Magnetic Separation or Filtration:

1. Volume of Frac Water (D)=1,500 mL
2. Reaction time ($\tau$)=1 hour
3. Catalytic Metal Sludge (S)=78.5 gm
4. Treated Frac Water (Q)=1,452 mL Second ($2^{nd}$) Processing Step—Metal Precipitation by Carbonate (e.g., $Na_2CO_3$) Followed by Filtration:

1. Volume of Treated Frac Water (Q) from $1^{st}$ processing step=570 mL
2. Reaction time ($\tau$)=38 min (0.63 hour)
3. Filtered Sludge (R)=74 gm
4. Treated Frac Water (U)=520 mL Note: In this unit operation, 570 mL was used from Treated Frac Water (Q). The remaining water was used for water testing.

See Table II below for the Experiment Trial 2 Results:

| | | Analyte Concentration (mg/L or ppm) | | | Analyte Removal (%) | | |
|---|---|---|---|---|---|---|---|
| | | 1st Processing Step Catalyst to Frac Water ratio = 25 g/L $H_2O_2$ conc. = 0.1M solution Catalyst to $H_2O_2$ (100%) ratio = 7 g/g | | 2nd Processing Step $Na_2CO_3$ to Frac Water ratio = 43.22 g/L | | | |
| | | Untreated | Diluted | Treated | Treated | | | |
| Sr. No. | Analyte | Frac Water (D) | Concentration (Step 1) (Y) * | Frac Water (Step 1) (Q) | Frac Water (Step 2) (U) | Step 1 = $\frac{Y-Q}{Y} \times 100$ | Step 2 = $\frac{Q-U}{Q} \times 100$ | Total** = $\frac{Y-U}{Y} \times 100$ |
| 1. | pH | 6.19 | — | 6.88 | 9.77 | — | — | — |
| 2. | Calcium | 6,900 | 6,843 | 6,700 | 32 | 2 | 100 | 100 |
| 3. | Iron | 22 | 22 | 2 | 1.2 | 91 | 40 | 95 |
| 4. | Barium | 740 | 734 | 690 | 1.3 | 6 | 100 | 100 |
| 5. | Strontium | 1,500 | 1,488 | 1400 | 15 | 6 | 99 | 99 |
| 6. | Hardness | 19,915 | 19,752 | 19,374 | 941 | 2 | 95 | 95 |
| 7. | Sulfate | 360 | 357 | 240 | 250 | 33 | -4 | 30 |
| 8. | Zinc | 0.25 | 0.25 | 6 | 0.25 | -2,320 | 96 | -1 |
| 9. | TSS | 140 | 139 | 21 | 19 | 85 | 10 | 86 |
| 10. | Potassium | 690 | 684 | 670 | 600 | 2 | 10 | 12 |
| 11. | Magnesium | 650 | 645 | 640 | 210 | 1 | 67 | 67 |
| 12. | Chloride | 59,000 | 58,516 | 58,000 | 56,000 | 1 | 3 | 4 |
| 13. | Lithium | 49 | 49 | 47 | 42 | 3 | 11 | 14 |
| 14. | TDS | 110,000 | 109,097 | 75,000 | 120,000 | 31 | -60 | -10 |
| 15. | Sodium | 26,000 | 25,787 | 26,000 | 39,000 | -1 | -50 | -51 |

* In the 1st processing step, adding $H_2O_2$ resulted in a 0.82% dilution factor.

Experimental Trial 3
First (1st) Processing Step—Catalytic Oxidation Followed by Magnetic Separation or Filtration
1. Volume of Frac Water (D)=5 gallons (18.927 gallons)
2. Reaction time (τ)=1 hour Second (2nd) Processing Step—Metal Precipitation by Carbonate (e.g., $Na_2CO_3$) Followed by Filtration:
1. Volume of Treated Frac Water (Q) from 1st processing step=1.056 gallons (4 liter)
2. Reaction time (τ)=30 min (0.5 hour)

Note: In this first unit process, only 1.056 gallons (4 liter) of frac water was filtered for the 2nd processing step.

See Table III below for the Experiment Trial 3 Results:

| | | Analyte Concentration (mg/L or ppm) | | | | Analyte Removal (%) | | |
|---|---|---|---|---|---|---|---|---|
| | | | 1st Processing Step Catalyst to Frac Water ratio = 25 g/L $H_2O_2$ conc. = 0.1M solution Catalyst to $H_2O_2$ (100%) ratio = 7 g/g | | 2nd Processing Step $Na_2CO_3$ to Frac Water ratio = 43.22 g/L | | | |
| | | | Diluted | Treated | Treated | | | |
| Sr. No. | Analyte | Untreated Frac Water (D) | Concentration (Step 1) (Y) * | Frac Water (Step 1) (Q) | Frac Water (Step 2) (U) | Step 1 = $\frac{Y-Q}{Y} \times 100$ | Step 2 = $\frac{Q-U}{Q} \times 100$ | Total** = $\frac{Y-U}{Y} \times 100$ |
| 1. | pH | 5.76 | — | 6.34 | 7.68 | — | — | — |
| 2. | Calcium | 13,000 | 12,893 | 12,000 | 230 | 7 | 98 | 98 |
| 3. | Iron | 85 | 84 | 0.19 | 0.12 | 100 | 37 | 100 |
| 4. | Barium | 2,700 | 2,678 | 2,500 | 180 | 7 | 93 | 93 |
| 5. | Strontium | 2,600 | 2,579 | 2,500 | 540 | 3 | 78 | 79 |
| 6. | Hardness | 37,420 | 37,113 | 34,920 | 3,732 | 6 | 89 | 90 |
| 7. | Sulfate | 220 | 218 | 490 | 580 | -125 | -18 | -166 |
| 8. | Zinc | 0.067 | 0.07 | 16 | 0.034 | -23,978 | 100 | 49 |
| 9. | TSS | 610 | 605 | 56 | 71 | 91 | -27 | 88 |
| 10. | Potassium | 420 | 417 | 400 | 400 | 4 | 0 | 4 |
| 11. | Magnesium | 1,200 | 1,190 | 1,200 | 770 | -1 | 36 | 35 |
| 12. | Chloride | 99,000 | 98,187 | 89,000 | 89,000 | 9 | 0 | 9 |
| 13. | Lithium | 110 | 109 | 100 | 88 | 8 | 12 | 19 |
| 14. | TDS | 180,000 | 178,522 | 160,000 | 170,000 | 10 | -6 | 5 |
| 15. | Sodium | 39,000 | 38,680 | 36,000 | 50,000 | 7 | -39 | -29 |

* In the 1st processing step, adding $H_2O_2$ resulted in a 0.82% dilution factor.

Experimental Trial 4

First (1st) Processing Step—Catalytic Oxidation Followed by Magnetic Separation or Filtration:
1. Volume of Frac Water (D)=10 gallons (37.854 liter)
2. Reaction time ($\tau$)=1 hour Second (2nd) Processing Step—Metal Precipitation by Carbonate (e.g., $Na_2CO_3$) Followed by Filtration
1. Volume of Treated Frac Water (Q) from 1st processing step=5 gallons (18.927 liter)
2. Reaction time ($\tau$)=30 min (0.5 hour)

Note: In this first unit process, only 5 gallons (18.927 liter) of frac water was filtered for the 2nd processing step.

See Table IV below for the Experiment Trial 4 Results:

| | | Analyte Concentration (mg/L or ppm) | | | | | |
|---|---|---|---|---|---|---|---|
| | | 1st Processing Step Catalyst to Frac Water ratio = 25 g/L $H_2O_2$ conc. = 0.1M solution Catalyst to $H_2O_2$ (100%) ratio = 7 g/g | | 2nd Processing Step $Na_2CO_3$ to Frac Water ratio = 43.22 g/L | | | |
| | | Untreated | Diluted | Treated | Treated | Analyte Removal (%) | | |
| Sr. No. | Analyte | Frac Water (D) | Concentration (Step 1) (Y) * | Frac Water (Step 1) (Q) | Frac Water (Step 2) (U) | Step 1 = $\frac{Y-Q}{Y} \times 100$ | Step 2 = $\frac{Q-U}{Q} \times 100$ | Total** = $\frac{Y-U}{Y} \times 100$ |
| 1. | pH | 5.88 | — | 6.32 | 8.5 | — | — | |
| 2. | Calcium | 13,000 | 12,893 | 13,000 | 83 | −1 | 99 | 99 |
| 3. | Iron | 85 | 84 | 0.24 | 0.12 | 100 | 50 | 100 |
| 4. | Barium | 2,700 | 2,678 | 2,100 | 48 | 22 | 98 | 98 |
| 5. | Strontium | 2,600 | 2,579 | 2,900 | 240 | −12 | 92 | 91 |
| 6. | Hardness | 37,420 | 37,113 | 37,830 | 2,995 | −2 | 92 | 92 |
| 7. | Sulfate | 220 | 218 | 360 | 330 | −65 | 8 | −51 |
| 8. | Zinc | 0.067 | 0.07 | 27 | 0.02 | −40,532 | 100 | 70 |
| 9. | TSS | 610 | 605 | 33 | 23 | 95 | 30 | 96 |
| 10. | Potassium | 420 | 417 | 510 | 480 | −22 | 6 | −15 |
| 11. | Magnesium | 1,200 | 1,190 | 1,300 | 670 | −9 | 48 | 44 |
| 12. | Chloride | 99,000 | 98,187 | 98,000 | 93,000 | 0 | 5 | 5 |
| 13. | Lithium | 110 | 109 | 110 | 96 | −1 | 13 | 12 |
| 14. | TDS | 180,000 | 178,522 | 150,000 | 140,000 | 16 | 7 | 22 |
| 15. | Sodium | 39,000 | 38,680 | 39,000 | 56,000 | −1 | −44 | −45 |

* In the 1st processing step, adding $H_2O_2$ resulted in a 0.82% dilution factor.

Figure 2:
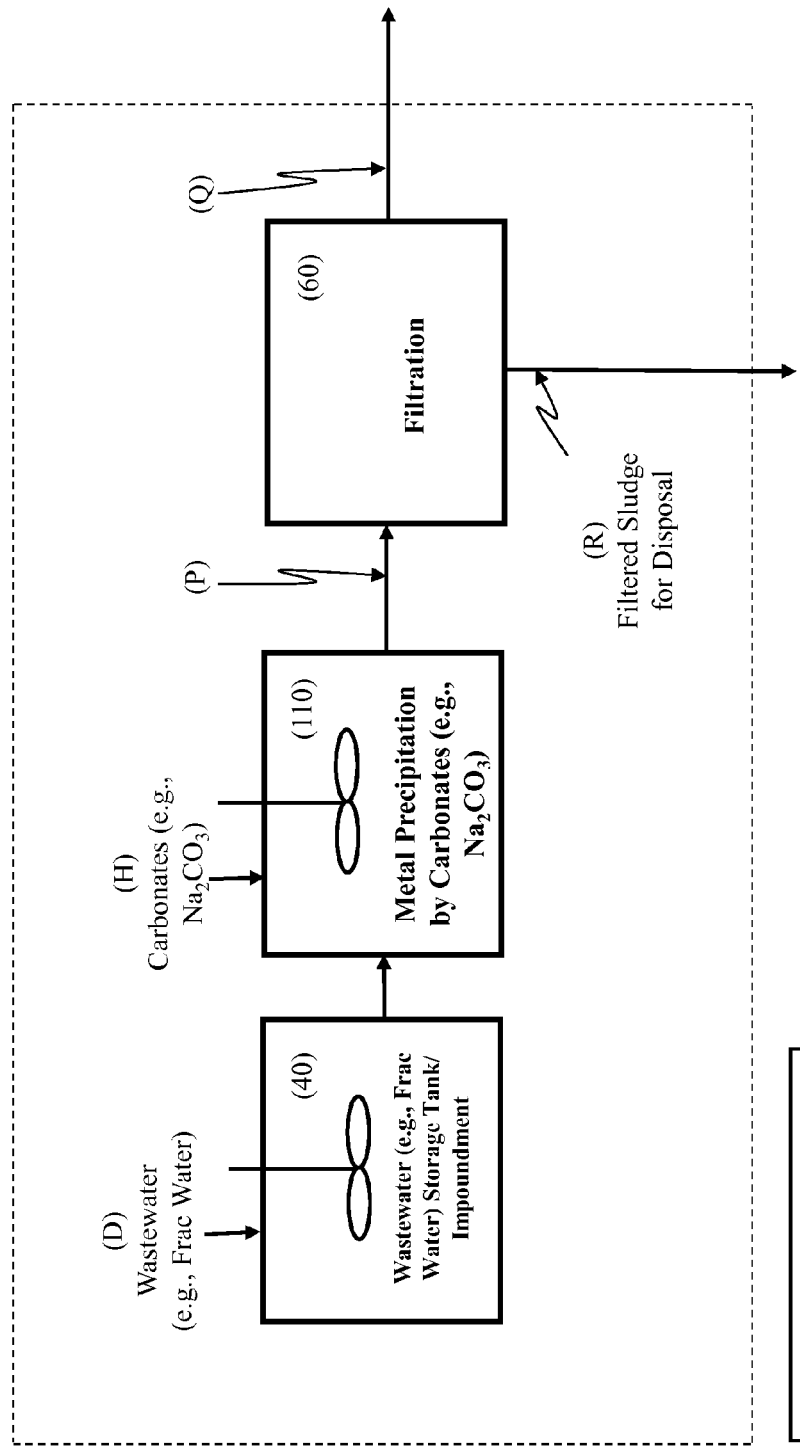
FIG. 2 is an illustration of a baseline case of the second processing step of the embodiment shown in FIG. 1.

Now turning to FIG. 2 that illustrates a baseline case of the second processing step of the embodiment shown in FIG. 1. Each of these processing steps consists of two (2) unit operations.

In this process, the first unit operation is metal precipitation by Carbonate(s) 110. In this unit operation, the wastewater D (e.g., frac water) is added to the Metal Precipitation Tank/Reactor 110 from the wastewater storage tank/impoundment 40 followed by adding measured amounts of Carbonate(s) (e.g., $Na_2CO_3$) (H) ($Na_2CO_3$ to Frac Water ratio=1-100 g/L). After that, the mixture is stirred continuously. Carbonate(s) addition precipitate divalent metals such as Barium, Strontium, Calcium, Magnesium and other metals as insoluble metals salts (i.e., barium carbonate, strontium carbonate, calcium carbonate, magnesium carbonate, etc.). The typical reaction time for this unit process is thirty (30) minutes to one (1) hour. After the metal precipitation unit operation is complete, the carbonate metal slurry P is transferred to physical separation units such as a Filtration unit 60.

In this process, the second unit operation is filtration 60. In this unit operation, the carbonate metal slurry P from the metal precipitation tank/reactor 110 is pumped or gravity fed to the filtration unit 60 (e.g. Ultrafiltration, Microfiltration, Reverse Osmosis and other types of filters known in the art). These filtration units separate treated frac water Q from the carbonate metal slurry P and produce a filtered sludge R. The water recovery for this unit operation is 85 to 95%. The filtered sludge R can then be disposed in a secured landfill. The treated frac water Q contains lower amounts of Iron (Fe), Calcium (Ca), Potassium (K), and Total Suspended Solids (TSS) than the wastewater, such as frac water.

Experimental trial of this baseline process 1 for the present invention of FIG. 1 is presented in Table V below.
1. Volume of Frac Water (D)=1,000 mL
2. Reaction time ($\tau$)=30 min (0.5 hour)
3. Filtered Sludge (R)=46 gm
4. Treated Frac Water (Q)=964 mL See Table V below for the Experiment Trial 5 Results:

| | | Analyte Concentration (mg/L or ppm) $Na_2CO_3$ to Frac Water ratio = 25.05 g/L | | |
|---|---|---|---|---|
| Sr. No. | Analyte | Untreated Frac Water (D) | Treated Frac Water (Q) | Analyte Removal (%) = $\frac{D-Q}{D} \times 100$ |
| 1. | pH | 3.44 | 6.07 | — |
| 2. | Calcium | 13,800 | 7,400 | 46 |
| 3. | Iron | 103 | 1.2 | 99 |
| 4. | Barium | 451 | 370 | 18 |
| 5. | Strontium | 2,690 | 2,500 | 7 |
| 6. | Hardness | 38,231 | 21,944 | 43 |
| 7. | Sulfate | 109 | 440 | −304 |
| 8. | Zinc | 0.575 | 0.25 | 57 |
| 9. | TSS | 1,020 | 36 | 96 |
| 10. | Potassium | 3,440 | 2,400 | 30 |
| 11. | Magnesium | 910 | 840 | 8 |

-continued

Analyte Concentration
(mg/L or ppm)
$Na_2CO_3$ to Frac
Water ratio = 25.05 g/L

| Sr. No. | Analyte | Untreated Frac Water (D) | Treated Frac Water (Q) | Analyte Removal (%) = $\frac{D-Q}{D} \times 100$ |
|---|---|---|---|---|
| 12. | Chloride | 145,000 | 130,000 | 10 |
| 13. | Lithium | 100 | 100 | 0 |
| 14. | TDS | 205,000 | 240,000 | −17 |
| 15. | Sodium | 46,900 | 66,000 | −41 |

Figure 3:
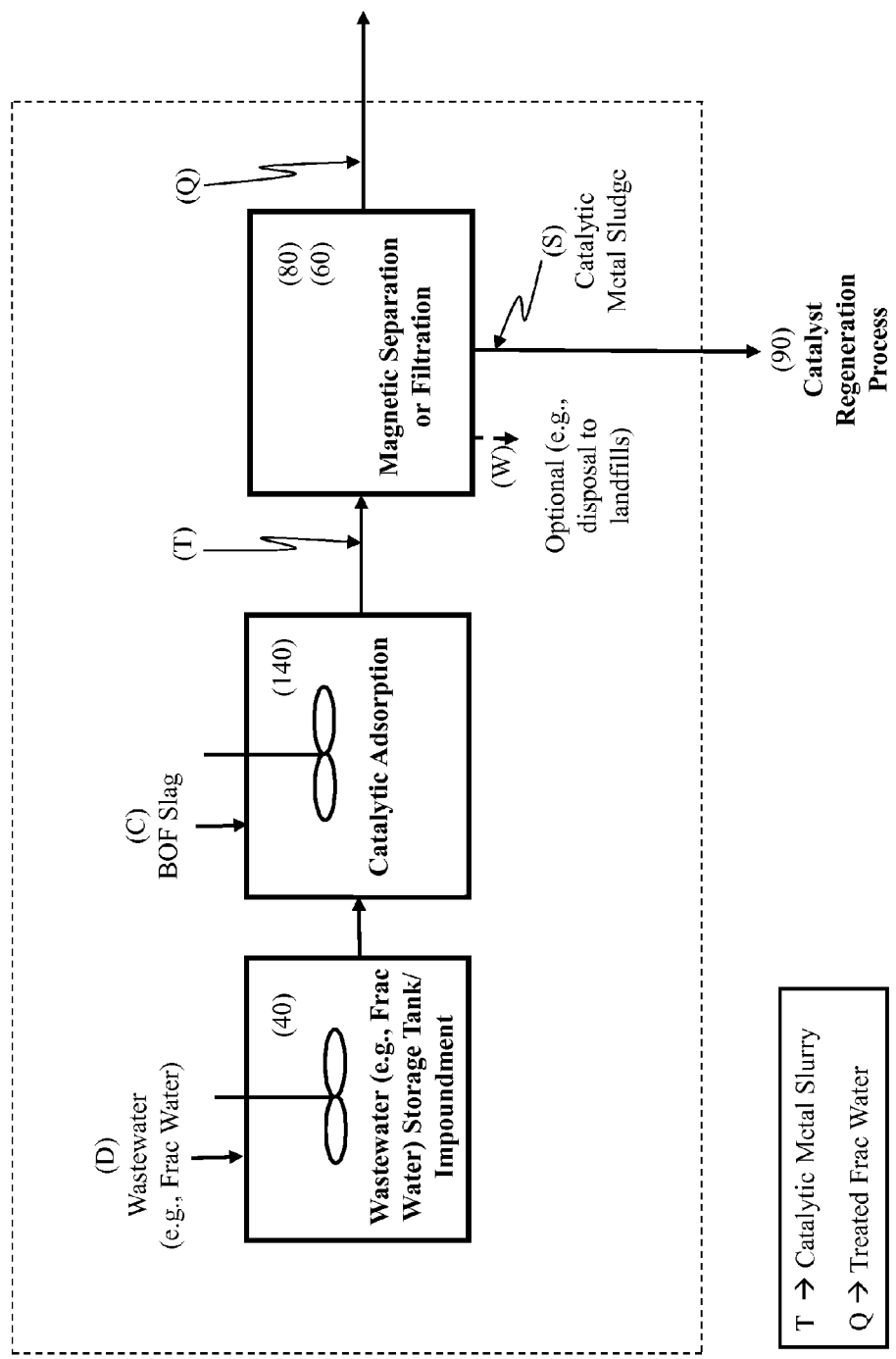
FIG. 3 is an illustration of a baseline case of Catalytic Adsorption followed by Magnetic Separation or Filtration, which is a baseline case for FIGS. 1, 4 and 5.
Figure 4:
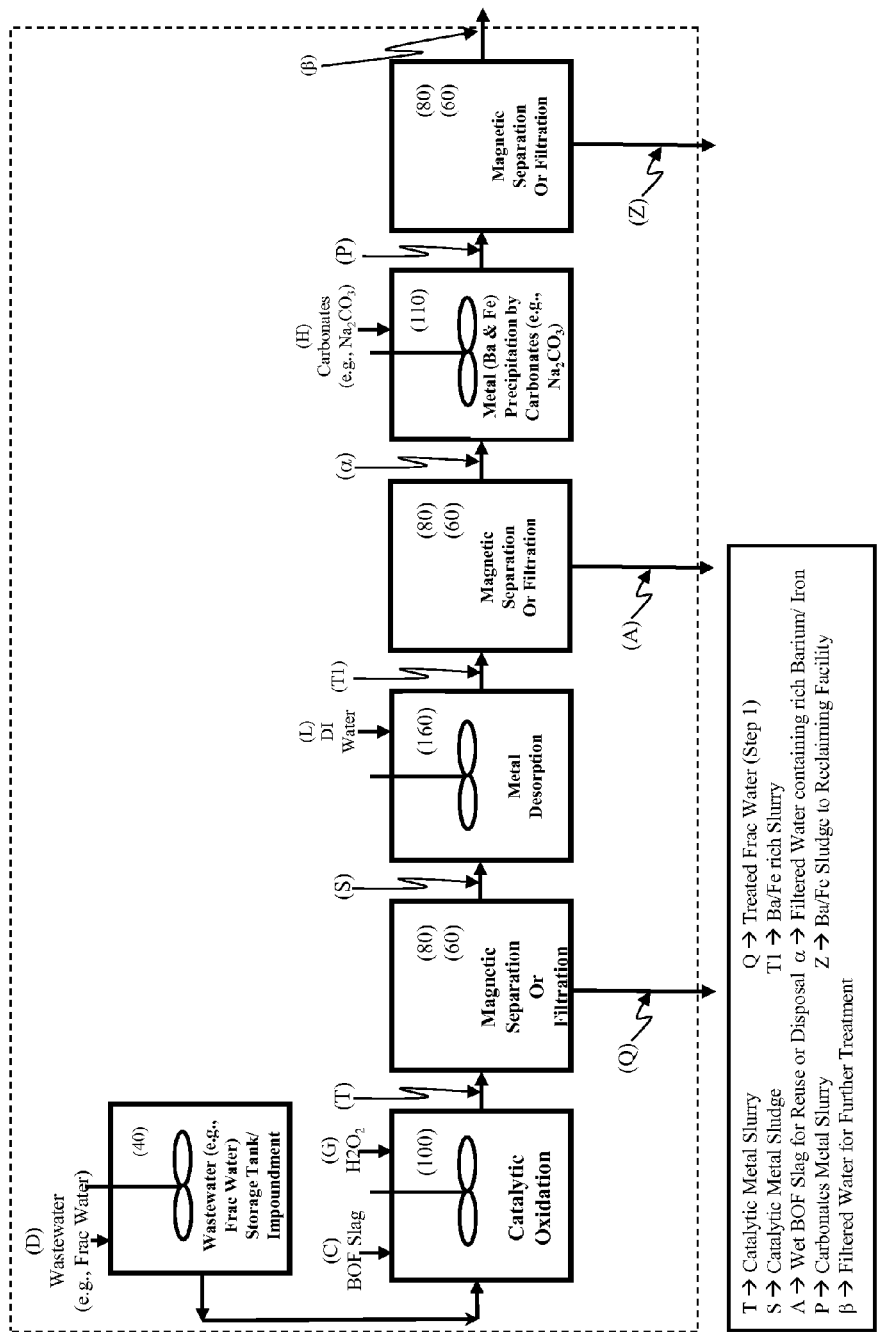
FIG. 4 is an illustration of another embodiment of the present invention including a three-step process for recovering rich barium/iron sludge, wherein the first processing step is Catalytic Oxidation followed by Magnetic Separation or Filtration, second processing step is Desorption of the Barium and soluble Fe, and third processing step is Precipitation of Barium and soluble Fe as carbonates.

Now turning to FIG. 3 illustrating a baseline case of Catalytic Adsorption followed by Magnetic Separation or Filtration, which is the second processing illustration of another embodiment of the present invention shown in FIG. 4.

FIG. 3 shows one (1) processing step for treating frac water. In this process, the first unit operation is catalytic adsorption 140. In this unit operation, the wastewater D (e.g., frac water) is added to a Catalytic Adsorption Tank/Reactor 140 from the wastewater storage tank/impoundment 40 followed by adding measured amounts of BOF Slag (Catalyst) C (Catalyst to Frac Water ratio=1-300 g/L). After that, the mixture is stirred continuously. The dried BOF Slag (Catalyst) (C) addition removes metals such as Iron, and Barium from the frac water by adsorption phenomenon. The typical reaction time for this unit process is thirty (30) minutes to three (3) hours. After the catalytic adsorption unit operation 140 is complete, the catalytic metal slurry T is transferred to physical separation units such as a Magnetic Separation Unit 80 or Filtration unit 60.

In the second processing step, the second unit operation is physical separation unit such as magnetic separation 80 or filtration 60. In this unit operation, the catalytic metal slurry T from catalytic adsorption tank/reactor 140 is pumped or gravity fed to the magnetic separation unit 80 or filtration unit 60 (e.g. Ultrafiltration, Microfiltration, Reverse Osmosis and other types of filters known in the art). These physical separation units separate the treated frac water Q from the catalytic metal slurry T and produce a catalytic metal sludge S. The water recovery for this unit operation is 80 to 90%. This catalytic metal sludge S can then be either disposed in a secured landfill W or recycled in a catalyst regeneration process 90. The treated frac water Q contains lower amounts of Iron (Fe), Potassium (K), and Total Suspended Solids (TSS) than the wastewater, such as frac water.

Experimental trial of this baseline process 2 (Catalytic Adsorption followed by Magnetic Separation or Filtration) for this embodiment of the present invention is presented in the Table VI below:

1. Volume of Frac Water (D)=1,000 mL
2. Weight of BOF Slag (Catalyst) (C)=250 gm
3. Reaction time (τ)=1 hour
4. Catalytic Metal Sludge (S)=405 gm
5. Treated Frac Water (Q)=834 mL See Table VI below for the Experiment Trial 6 Results:

TABLE VI

| | | Analyte Concentration (mg/L or ppm) | | |
|---|---|---|---|---|
| Sr. No. | Analyte | Untreated Frac Water (D) | Treated Frac Water (Q) | Analyte Removal (%) = $\frac{D-Q}{D} \times 100$ |
| 1. | pH | 3.54 | 7.73 | — |
| 2. | Calcium | 13,800 | 15,000 | −9 |
| 3. | Iron | 103 | 1.2 | 99 |
| 4. | Barium | 451 | 450 | 0.22 |
| 5. | Strontium | 2,690 | 2,800 | −4 |
| 6. | Hardness | 38,231 | 41,600 | −9 |
| 7. | Sulfate | 109 | 420 | −285 |
| 8. | Zinc | 0.575 | 4.9 | −752 |
| 9. | TSS | 1,020 | 55 | 95 |
| 10. | Potassium | 3,440 | 2,400 | 30 |
| 11. | Magnesium | 910 | 1,000 | −10 |
| 12. | Chloride | 145,000 | 130,000 | 10 |
| 13. | Lithium | 100 | 100 | 0 |
| 14. | TDS | 205,000 | 25,0000 | −22 |
| 15. | Sodium | 46,900 | 54,000 | −15 |

FIG. 4 is an illustration of another embodiment of the present invention including a three-step process for recovering rich barium/iron sludge, wherein the first processing step is Catalytic Oxidation followed by Magnetic Separation or Filtration, second processing step is Desorption of the Barium and soluble Fe, and third processing step is Precipitation of Barium and soluble Fe as carbonates.

FIG. 4 shows three (3) processing steps for recovering rich barium/iron sludge by treating frac water. Each of these processing steps consists of two (2) unit operations. In the first processing step, the first unit operation is catalytic oxidation 100. In this unit operation, the wastewater D (e.g., frac water) is added to the Catalytic Oxidation Tank/Reactor 100 from the wastewater storage tank/impoundment 40 followed by adding measured amounts of BOF Slag (Catalyst) (C) (Catalyst to Frac Water ratio=1-300 g/L), and Hydrogen Peroxide (G) (to produce a 0.1-2.0 M solution). The Catalytic Oxidation unit operation (100) produces reactions because of the reaction between Iron (Fe) particles in the BOF Slag (Catalyst) C and Hydrogen Peroxide G. This reaction generates the hydroxyl free radicals (OH.), which is capable of removing/oxidizing organics, metals, and possibly radionuclides. One embodiment of the present invention removal mechanism for this unit operation is a combination of chemical and electrolytic mechanisms: catalytic oxidation, colloidal co-precipitation and metals adsorption onto the catalyst (BOF Slag particles) surface. The Catalytic Metal Slurry T is then transferred to physical separation processes such as magnetic separation unit 80 or filtration unit 60 (e.g. Ultrafiltration, Microfiltration, Reverse Osmosis and other types of filters known in the art). The typical reaction time for this unit operation is thirty (30) minutes to three (3) hours.

In the first processing step, the second unit operation is physical separation unit such as magnetic separation 80 or filtration 60. In this unit operation, the catalytic metal slurry T from the catalytic oxidation tank/reactor 100 is pumped or gravity fed to the magnetic separation unit 80 or filtration unit 60 (e.g. Ultrafiltration, Microfiltration, Reverse Osmosis and other types of filters known in the art). These physical separation units separate the treated frac water Q from the catalytic metal slurry T and produce a catalytic metal sludge S. The water recovery for this unit operation is 85 to 95%. This catalytic metal sludge S can then be either disposed in a secured landfill W or recycled in a catalyst regeneration process 90 (see FIG. 3). The treated frac water Q contains lower amounts of Iron (Fe), Barium (Ba), Sulfates ($SO_4$) and Total Suspended Solids (TSS) than the wastewater, such as frac water.

In the second processing step, the first unit operation is metal desorption process 160. In this unit operation, the catalytic metal sludge S is added to Metal Desorption Process 160 followed by adding measured amounts of De-ionized DI water (L) (DI Water (l) to Catalyst Metal Sludge S=0.25-2 mL/g). After that, the mixture is stirred continuously. DI water desorbs barium and iron from the catalytic metal sludge S. The typical reaction time for this unit operation is thirty (30) minutes to one (1) hour. After the metal desorption process 160 is complete, the Barium/Iron rich slurry T1 is transferred to physical separation units such as Magnetic separation 80 or Filtration unit 60.

In the second processing step, the second unit operation is physical separation unit such as magnetic separation 80 or filtration 60. In this unit operation, the Barium/Iron rich slurry T1 from metal desorption tank/reactor 160 is pumped or gravity fed to the magnetic separation unit 80 or filtration unit 60 (e.g. Ultrafiltration, Microfiltration, Reverse Osmosis and other types of filters known in the art). These physical separation units separate the wet BOF Slag for reuse or disposal (A) from the Barium/Iron rich slurry T1 and produce filtered water containing rich Barium/Iron sludge a.

In the third processing step, the first unit operation is metal precipitation by Carbonate(s) 110. In this unit operation, the wastewater (e.g., frac water) D is added to the Metal Precipitation Tank/Reactor 110 from the wastewater storage tank/impoundment 40 followed by adding measured amounts of Carbonate(s) (e.g., $Na_2CO_3$) H ($Na_2CO_3$ to Frac Water ratio=1-25 g/L). After that, the mixture is stirred continuously. The Carbonate(s) addition precipitates out barium and iron as insoluble barium carbonate and iron carbonate, respectively. The typical reaction time for this unit process is thirty (30) minutes to one (1) hour. After the metal precipitation unit operation is complete, the carbonate metal slurry P is transferred to physical separation units such as a Filtration unit 60.

In the third processing step, the second unit operation is filtration 60. In this unit operation, the carbonate metal slurry P from the metal precipitation tank/reactor 110 is pumped or gravity fed to the filtration unit 60 (e.g. Ultrafiltration, Microfiltration, Reverse Osmosis and other types of filters known in the art). These filtration units separate a rich barium/iron (Ba/Fe) sludge Z from the carbonate metal slurry P and produce a filtered water for further treatment β. A rich barium/iron (Ba/Fe) sludge z can be then send to barium refining facility for barium reclamation.

An embodiment of this present invention includes a composition for the first ($1^{st}$) Processing Step—Catalytic Oxidation followed by Magnetic Separation or Filtration to include Catalyst to Frac Water ratio=1-300 g/L, $H_2O_2$ Concentration=0.1-2 M solution, and Catalyst to $H_2O_2$ (100%) ratio=0.25-7 g/g; the second ($2^{nd}$) Processing Step—Desorption of the Barium and Soluble Fe to include adding measured amounts of De-ionized DI water (L) (DI Water (l) to Catalyst Metal Sludge S=0.25-2 mL/g; and the third ($3^{rd}$) Processing Step—Precipitation of Barium and Soluble Fe by Carbonate(s) (e.g., $Na_2CO_3$) followed by Filtration to include $Na_2CO_3$ to Frac Water ratio=1-100 g/L.

Another embodiment of this present invention includes a composition for the first ($1^{st}$) Processing Step—Catalytic Oxidation followed by Magnetic Separation or Filtration to include Catalyst to Frac Water ratio=240-270 g/L, $H_2O_2$ Concentration=1-1.5 M solution, and Catalyst to $H_2O_2$ (100%) ratio=5.3-7.5 g/g; the second ($2^{nd}$) Processing Step—Desorption of the Barium and Soluble Fe to include adding measured amounts of De-ionized DI water (L) (DI Water (l) to Catalyst Metal Sludge S=0.25-2 mL/g; and the third ($3^{rd}$) Processing Step—Precipitation of Barium and Soluble Fe by Carbonate(s) (e.g., $Na_2CO_3$) followed by Filtration to include $Na_2CO_3$ to Frac Water ratio=40-45 g/L.

Yet another embodiment of this present invention (see Tables VII and VIII) includes a composition for the first ($1^{st}$) Processing Step—Catalytic Oxidation followed by Magnetic Separation or Filtration to include Catalyst to Frac Water ratio=250 g/L, $H_2O_2$ Concentration=1.35 M solution, and Catalyst to $H_2O_2$ (100%) ratio=3 g/g; the second ($2^{nd}$) Processing Step—Desorption of the Barium and Soluble Fe to include adding measured amounts of De-ionized DI water (L) (DI Water (l) to Catalyst Metal Sludge S=0.25-2 mL/g; and the third ($3^{rd}$) Processing Step—Precipitation of Barium and Soluble Fe by Carbonate(s) (e.g., $Na_2CO_3$) followed by Filtration to include $Na_2CO_3$ to Frac Water ratio=43.22 g/L.

Experimental trials of this embodiment of the present invention (three-step unit process) are conducted in the experimental trials 7, 8, 9, 10, 11 and 12 with results presented in Tables VII, VIII, IX, X, XII, and XII, respectively.

Experimental Trial 7

First ($1^{st}$) Processing Step—Catalytic Oxidation Followed by Magnetic Separation or Filtration:

1. Volume of Frac Water (D)=480 mL
2. Reaction time (τ)=19.45 hours
3. Catalytic Metal Sludge (S)=285 gm
4. Treated Frac Water (Q)=710 mL See Table VII below for the Experiment Trial 7 Results:

| | | Analyte Concentration (mg/L or ppm) 1st Processing Step Catalyst to Frac Water ratio = 250 g/L $H_2O_2$ conc. = 1.35M solution Catalyst to $H_2O_2$ (100%) ratio = 3 g/g | | | |
|---|---|---|---|---|---|
| Sr. No. | Analyte | Untreated Frac Water (D) | Diluted Concentration (Y) * | Treated Frac Water (Q) | Analyte Removal (%) = $\frac{Y-Q}{Y} \times 100$ |
| 1. | pH | 4.3 | — | 7.5 | — |
| 2. | Calcium | 12,000 | 6,546 | 7,720 | −18 |
| 3. | Iron | 85 | 47 | 1.3 | 97 |
| 4. | Barium | 447 | 244 | 97 | 60 |
| 5. | Strontium | 2,440 | 1,331 | 1,470 | −10 |
| 6. | Hardness | 33,846 | 18,463 | 22,719 | −23 |
| 7. | Sulfate | 100 | 55 | 49 | 10 |
| 8. | Zinc | 0.62 | 0.34 | 7.23 | −2,038 |
| 9. | Magnesium | 938 | 512 | 834 | −63 |
| 10. | Chloride | 111,000 | 60,551 | 60,100 | 1 |
| 11. | TDS | 184,000 | 100,372 | 110,000 | −10 |
| 12. | Sodium | 40,600 | 22,147 | 23,200 | −5 |
| 13 | TOC | 21 | 11 | 14 | −22 |

* In the processing step, adding $H_2O_2$ resulted in a 45.45% dilution factor.

Experimental Trial 8
First (1st) Processing Step—Catalytic Oxidation Followed by Magnetic Separation or Filtration:
1. Volume of Frac Water (D)=580 mL
2. Reaction time (τ)=23 hours
3. Catalytic Metal Sludge (S)=280 gm
4. Treated Frac Water (Q)=924 mL
See Table VIII below for the Experiment Trial 8 Results:

Experimental Trial 9
First (1st) Processing Step—Catalytic Oxidation Followed by Magnetic Separation or Filtration:
1. Volume of Frac Water (D)=1,080 mL
2. Reaction time (τ)=3 hours
3. Catalytic Metal Sludge (S)=750 gm
4. Treated Frac Water (Q)=1,010 mL

| | | Analyte Concentration (mg/L or ppm) 1st Processing Step Catalyst to Frac Water ratio = 250 g/L $H_2O_2$ conc. = 1.35M solution Catalyst to $H_2O_2$ (100%) ratio = 3 g/g | | | |
|---|---|---|---|---|---|
| Sr. No. | Analyte | Untreated Frac Water (D) | Diluted Concentration (Y) * | Treated Frac Water (Q) | Analyte Removal (%) = $\frac{Y-Q}{Y} \times 100$ |
| 1. | pH | 4.6 | — | 7.45 | — |
| 2. | Calcium | 12,000 | 6,546 | 6,290 | 4 |
| 3. | Iron | 85 | 46 | 0.86 | 98 |
| 4. | Barium | 447 | 244 | 76 | 69 |
| 5. | Strontium | 2,440 | 1,331 | 1,260 | 5 |
| 6. | Hardness | 33,846 | 18,463 | 18,616 | −1 |
| 7. | Sulfate | 100 | 55 | 40.5 | 26 |
| 8. | Zinc | 0.62 | 0.34 | 4.82 | −1,325 |
| 9. | Magnesium | 938 | 512 | 705 | −38 |
| 10. | Chloride | 111,000 | 60,551 | 57,800 | 5 |
| 11. | TDS | 184,000 | 100,372 | 102,500 | −2 |
| 12. | Sodium | 40,600 | 22,147 | 22,000 | 1 |

* In the processing step, adding $H_2O_2$ resulted in a 45.45% dilution factor.

See Table IX below for the Experiment Trial 9 Results:

Analyte Concentration (mg/L or ppm)
1$^{st}$ Processing Step
Catalyst to Frac Water ratio = 500 g/L
H$_2$O$_2$ conc. = 1.54M solution
Catalyst to H$_2$O$_2$ (100%) ratio = 8.41 g/g

| Sr. No. | Analyte | Untreated Frac Water (D) | Diluted Concentration (Y) * | Treated Frac Water (Q) | Analyte Removal (%) = $\frac{Y-Q}{Y} \times 100$ |
|---|---|---|---|---|---|
| 1. | pH | 4.3 | — | 8.50 | — |
| 2. | Calcium | 12,000 | 10,550 | 11,600 | −10 |
| 3. | Iron | 85 | 75 | 1.86 | 98 |
| 4. | Barium | 447 | 393 | 214 | 46 |
| 5. | Strontium | 2,440 | 2,145 | 2,100 | 2 |
| 6. | Hardness | 33,846 | 29,757 | 32,829 | −10 |
| 7. | Sulfate | 100 | 88 | 58.7 | 33 |
| 8. | Zinc | 0.62 | 0.55 | 1.28 | −135 |
| 9. | Magnesium | 938 | 825 | 934 | −13 |
| 10. | Chloride | 111,000 | 97,591 | 98,700 | −1 |
| 11. | TDS | 184,000 | 161,773 | 200,700 | −24 |
| 12. | Sodium | 40,600 | 35,696 | 38,200 | −7 |

* In the processing step, adding H$_2$O$_2$ resulted in a 12.08% dilution factor.

Experimental Trial 10
First (1$^{st}$) Processing Step—Catalytic Oxidation Followed by Magnetic Separation or Filtration:
1. Volume of Frac Water (D)=1,500 mL
2. Reaction time ($\tau$)=1 hour
3. Catalytic Metal Sludge (S)=70 gm
4. Treated Frac Water (Q)=1,470 mL
See Table X below for the Experiment Trial 10 Results:

Experimental Trial 11
First (1$^{st}$) Processing Step—Catalytic Oxidation Followed by Magnetic Separation or Filtration:
1. Volume of Frac Water (D)=1,500 mL
2. Reaction time ($\tau$)=1 hour
3. Catalytic Metal Sludge (S)=79 gm
4. Treated Frac Water (Q)=1,464 mL

TABLE X

Analyte Concentration (mg/L or ppm)
1$^{st}$ Processing Step
Catalyst to Frac Water ratio = 25 g/L
H$_2$O$_2$ conc. = 0.1M solution
Catalyst to H$_2$O$_2$ (100%) ratio = 7 g/g

| Sr. No. | Analyte | Untreated Frac Water (D) | Diluted Concentration (Step 1) (Y) * | Treated Frac Water (Step 1) Q | Analyte Removal (%) = $\frac{Y-Q}{Y} \times 100$ |
|---|---|---|---|---|---|
| 1. | pH | 3.77 | — | 6.31 | — |
| 2. | Calcium | 13,800 | 13,687 | 13,000 | 5 |
| 3. | Iron | 103 | 102 | 5 | 95 |
| 4. | Barium | 451 | 447 | 430 | 4 |
| 5. | Strontium | 2,690 | 2,668 | 2,500 | 6 |
| 6. | Hardness | 38,231 | 37,917 | 36,313 | 4 |
| 7. | Sulfate | 109 | 108 | 21 | 81 |
| 8. | Zinc | 0.5700 | 0.5653 | 19 | −3,261 |
| 9. | TSS | 1,020 | 1,012 | 60 | 94 |
| 10. | Potassium | 3,440 | 3,412 | 2,200 | 36 |
| 11. | Magnesium | 910 | 903 | 930 | −3 |
| 12. | Chloride | 145,000 | 143,810 | 89,000 | 38 |
| 13. | Lithium | 100 | 99 | 94 | 5 |
| 14. | TDS | 205,000 | 203,318 | 150,000 | 26 |
| 15. | Sodium | 46,900 | 46,515 | 48,000 | −3 |

* In the processing step, adding H$_2$O$_2$ resulted in a 0.82% dilution factor

See Table XI below for the Experiment Trial 11 Results:

TABLE XI

Analyte Concentration (mg/L or ppm)
$1^{st}$ Processing Step
Catalyst to Frac Water ratio = 25 g/L
$H_2O_2$ conc. = 0.1M solution
Catalyst to $H_2O_2$ (100%) ratio = 7 g/g

| Sr. No. | Analyte | Untreated Frac Water (D) | Diluted Concentration (Step 1) (Y) * | Treated Frac Water (Step 1) (Q) | Analyte Removal (%) = $\frac{Y-Q}{Y} \times 100$ |
|---|---|---|---|---|---|
| 1. | pH | 3.80 | — | 6.35 | — |
| 2. | Calcium | 13,800 | 13,687 | 14,000 | −2 |
| 3. | Iron | 103 | 102 | 5 | 95 |
| 4. | Barium | 451 | 447 | 450 | −1 |
| 5. | Strontium | 2,690 | 2,668 | 2,900 | −9 |
| 6. | Hardness | 38,231 | 37,917 | 36,313 | −3 |
| 7. | Sulfate | 109 | 108 | 21 | 81 |
| 8. | Zinc | 0.5700 | 0.5653 | 23 | −3,933 |
| 9. | TSS | 1,020 | 1,012 | 69 | 93 |
| 10. | Potassium | 3,440 | 3,412 | 2,400 | 30 |
| 11. | Magnesium | 910 | 903 | 1,000 | −11 |
| 12. | Chloride | 145,000 | 143,810 | 120,000 | 17 |
| 13. | Lithium | 100 | 99 | 100 | −1 |
| 14. | TDS | 205,000 | 203,318 | 160,000 | 21 |
| 15. | Sodium | 46,900 | 46,515 | 51,000 | −10 |

* In the processing step, adding $H_2O_2$ resulted in a 0.82% dilution factor.

Experimental Trial 11

First ($1^{st}$) Processing Step—Catalytic Oxidation Followed by Magnetic Separation or Filtration:
1. Volume of Frac Water (D)=1,500 mL
2. Reaction Time ($\tau$)=1 hour
3. Catalytic Metal Sludge (S)=78.5 gm
4. Treated Frac Water (Q)=1,452 mL See Table XII below for the Experiment Trial 12 Results:

TABLE XII

Analyte Concentration (mg/L or ppm)
$1^{st}$ Processing Step
Catalyst to Frac Water ratio = 25 g/L
$H_2O_2$ conc. = 0.1M solution
Catalyst to $H_2O_2$ (100%) ratio = 7 g/g

| Sr. No. | Analyte | Untreated Frac Water (D) | Diluted Concentration (Step 1) (Y) * | Treated Frac Water (Step 1) (Q) | Analyte Removal (%) = $\frac{Y-Q}{Y} \times 100$ |
|---|---|---|---|---|---|
| 1. | pH | 6.19 | — | 6.88 | — |
| 2. | Calcium | 6,900 | 6,843 | 6,700 | 2 |
| 3. | Iron | 22 | 22 | 2 | 91 |
| 4. | Barium | 740 | 734 | 690 | 6 |
| 5. | Strontium | 1,500 | 1,488 | 1,400 | 6 |
| 6. | Hardness | 19,915 | 19,752 | 19,374 | 2 |
| 7. | Sulfate | 360 | 357 | 240 | 33 |
| 8. | Zinc | 0.25 | 0.25 | 5.9 | −2,280 |
| 9. | TSS | 140 | 139 | 21 | 85 |
| 10. | Potassium | 690 | 684 | 670 | 2 |
| 11. | Magnesium | 650 | 645 | 640 | 1 |
| 12. | Chloride | 59,000 | 58,516 | 58,000 | 1 |
| 13. | Lithium | 49 | 49 | 47 | 3 |
| 14. | TDS | 110,000 | 109,097 | 75,000 | 31 |
| 15. | Sodium | 26,000 | 25,787 | 26,000 | −1 |

* In the processing step, adding $H_2O_2$ resulted in a 0.82% dilution factor.

Figure 5:
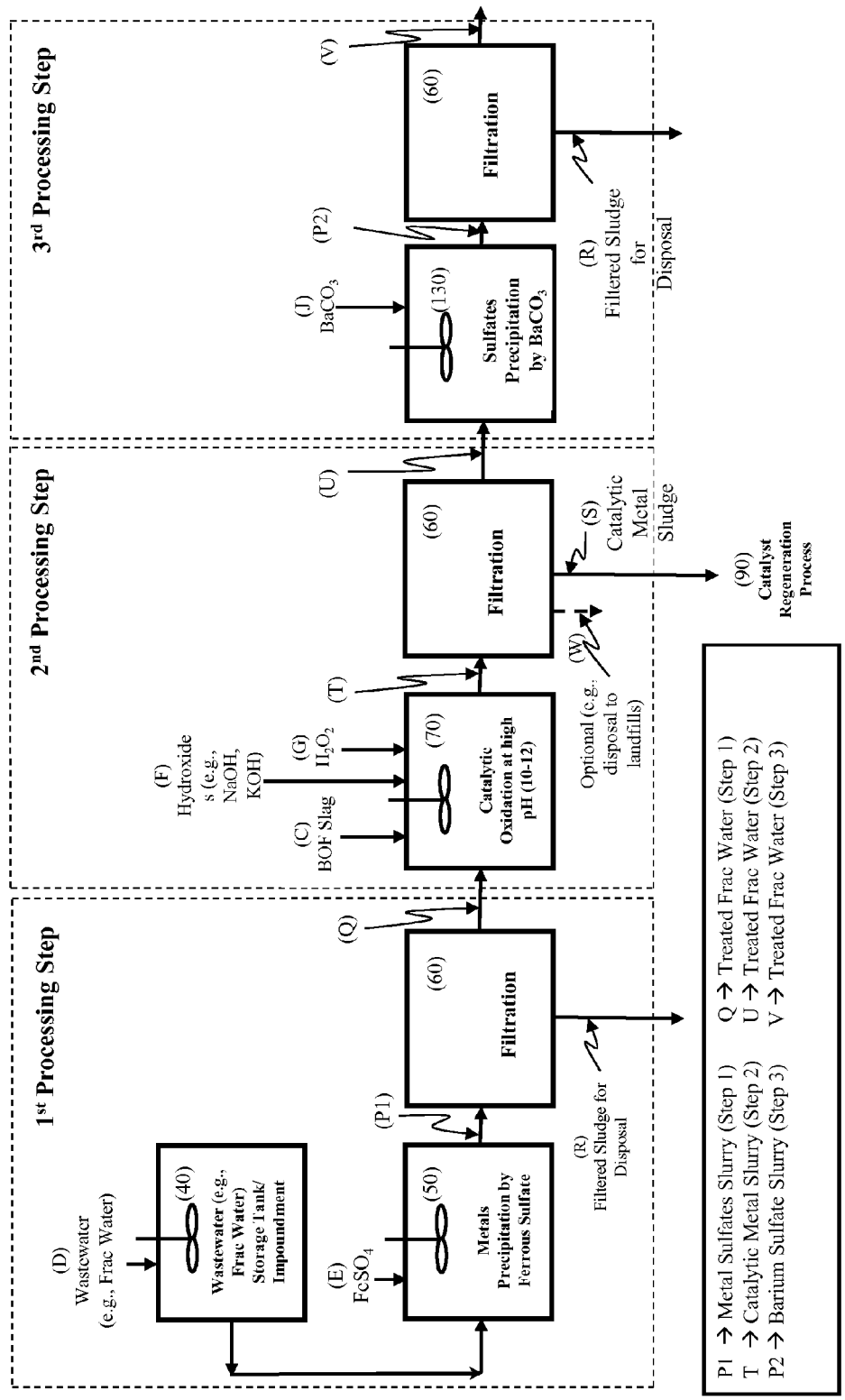
FIG. 5 is an illustration of another embodiment of the present invention including a three-step process for recovering rich barium/iron sludge, wherein the first processing step is Metal Precipitation by Ferrous Sulfate followed by Filtration, second processing step is Catalytic Oxidation at high pH followed by Filtration, and third processing step is Sulfates Precipitation by Barium Carbonate followed by Filtration.

Now turning to FIG. 5 that illustrates another embodiment of the present invention including a three-step process for recovering rich barium/iron sludge, wherein the first processing step is Metal Precipitation by Ferrous Sulfate followed by Filtration, second processing step is Catalytic Oxidation at high pH followed by Filtration, and third processing step is Sulfates Precipitation by Barium Carbonate followed by Filtration.

The intent of the process shown FIG. 5 is to take advantage of the use of a sulfate salt, namely Ferrous Sulfate, to remove the divalent cations. The present invention does not use either calcium sulfate or sodium sulfate, since doing so would increase the calcium and sodium concentration to total dissolved solids (TDS). The challenge would be to find approach to removing the sulfates and iron. Since the soluble iron (Fe) could be high leaving the first processing step, the present invention uses catalytic oxidation at high Ph in the Second Processing Step to remove the soluble iron and enhance the removal of Magnesium without the addition of any coagulating, flocculating or softening agents. In addition, in this process the Second Processing Step can be replaced by the Catalytic Adsorption to achieve high Fe removal efficiency at lower Mg removal. The sulfate is removed in the Third Processing Step by the addition of Barium Carbonate.

FIG. 5 shows three (3) processing steps for treating frac water. Each of these processing steps consists of two (2) unit operations. In the first processing step, the first unit operation is metal precipitation by Ferrous Sulfate 50. In this unit operation, the wastewater (e.g., frac water) D is added to the Metal Precipitation Tank/Reactor 50 from the wastewater storage tank/impoundment 40 followed by adding measured amounts of $FeSO_4$ (E) ($FeSO_4$ to Frac Water ratio=2-120 g/L). After that, the mixture is stirred continuously. Sulfates addition precipitate divalent metals such as Barium, Strontium, Calcium and other metals as insoluble metals salts (i.e., barium sulfate, strontium sulfate, calcium sulfate, etc.). The typical reaction time for this unit operation is thirty (30) minutes to one (1) hour. After the metal precipitation unit operation is complete, the metal sulfates slurry P1 is transferred to physical separation units such as a Filtration unit 60.

In the first processing step, the second unit operation is filtration 60. In this unit operation, the metal sulfates slurry P1 from the metal precipitation tank/reactor 50 is pumped or gravity fed to the filtration unit 60 (e.g. Ultrafiltration, Microfiltration, Reverse Osmosis and other types of filters known in the art). These filtration units separate treated frac water Q from the metal sulfates slurry P1 and produce a filtered sludge R. The water recovery for this unit operation is 85 to 95%. The filtered sludge R can then be disposed in a secured landfill. The treated frac water Q contains lower amounts of Barium (Ba), Calcium (Ca), Strontium (Sr), Total Suspended Solids (TSS), and Hardness (as $CaCO_3$) than the wastewater (such as frac water), but it does contain high amounts of Iron (Fe) and Sulfates ($SO_4$).

In the second processing step, the first unit operation is catalytic oxidation at high pH 70. In this unit operation, treated frac water from first processing step Q is added in the Catalytic Oxidation Tank/Reactor 70 followed by measured amounts of BOF Slag (Catalyst) C (Catalyst to Frac Water ratio=1-300 g/L), Hydrogen Peroxide G (to produce a 0.1-2.0 M solution), and Sodium Hydroxide (or other types of strong bases) F (NaOH to Frac Water ratio=5-100 g/L). After that, the mixture is stirred continuously. This Catalytic Oxidation at higher pH unit operation 70 produces a Fenton-like reaction because of the reaction between Iron (Fe) particles in the BOF Slag (Catalyst) C and Hydrogen Peroxide G. The Catalytic Oxidation at higher pH unit operation 70 produces a colloidal mix of insoluble metal hydroxides which readily adsorb onto the surface of BOF slag particles (ferrite particles). This colloidal phase (referred hereinafter as catalytic metal slurry (T)) is then transferred to physical separation processes such as filtration unit (e.g. Ultrafiltration, Microfiltration, Reverse Osmosis and other types of filters known in the art) (60). The typical reaction time for this unit operation is thirty (30) minutes to three (3) hours. The proposed removal mechanism for this unit operation is a combination of chemical and electrolytic mechanisms: catalytic oxidation, colloidal co-precipitation and metals adsorption onto the catalyst (BOF Slag particles) surface.

In the second processing step, the second unit operation is filtration 60. In this unit operation, the catalytic metal slurry T from the Catalytic Oxidation Tank/Reactor 70 is pumped or gravity fed to the filtration unit 60 (e.g. Ultrafiltration, Microfiltration, Reverse Osmosis and other types of filters known in the art). These filtration units separate treated frac water U from the catalytic metal slurry T and produce a catalytic metal sludge S. The water recovery for this unit operation is 80 to 90%. This catalytic metal sludge S can then be either disposed in a secured landfill W or recycled in a catalyst regeneration process 90 (see FIG. 3). The treated frac water U contains lower amounts of Iron (Fe), Barium (Ba), Magnesium (Mg), Calcium (Ca), Strontium (Sr), Total Suspended Solids (TSS), and Hardness (as $CaCO_3$) than the wastewater, such as frac water.

In the third processing step, the first unit operation 130 is sulfates precipitation by Barium Carbonate ($BaCO_3$). In this unit operation, the treated frac water from second processing step U is added to a Sulfates Precipitation Tank/Reactor 130 followed by adding measured amounts of Barium Carbonate ($BaCO_3$) (J) ($BaCO_3$ to Frac Water ratio=2.5-10 g/L). After that, the mixture is stirred continuously. Barium Carbonate addition removes sulfates from the frac water as Barium Sulfate ($BaSO_4$). The typical reaction time for this unit operation is thirty (30) minutes to one (1) hour. After the metal precipitation unit operation is complete, the barium sulfate slurry P2 is transferred to physical separation units such as a Filtration unit 60.

In the third processing step, the second unit operation is filtration 60. In this unit operation, the barium sulfate slurry P2 from the metal precipitation tank/reactor 130 is pumped or gravity fed to the filtration unit 60 (e.g. Ultrafiltration, Microfiltration, Reverse Osmosis and other types of filters known in the art) 60. These filtration units separate treated frac water V from the barium sulfate slurry P2 and produce a filtered sludge R. The water recovery for this unit operation is 85 to 95%. The filtered sludge R can then be disposed in a secured landfill. The treated frac water U contains lower amounts of Iron (Fe), Barium (Ba), Magnesium (Mg), Calcium (Ca), Strontium (Sr), Sulfate ($SO_4$), Total Suspended Solids (TSS), and Hardness (as $CaCO_3$) than the wastewater, such as frac water.

An embodiment of this present invention includes a composition for the first ($1^{st}$) Processing Step—Metal Precipitation by Ferrous Sulfate followed by Filtration to include $FeSO_4$ to Frac Water ratio=2-120 g/L; the second ($2^{nd}$) Processing Step—Catalytic Oxidation at high pH followed by Filtration to include Catalyst to Frac Water ratio=1-300 g/L, $H_2O_2$ Concentration=0.1-2 M solution, Catalyst to $H_2O_2$ (100%) ratio=0.25-7 g/g, and NaOH to Frac Water ratio=5-100 g/L; and the third ($3^{rd}$) Processing Step—Sulfates Precipitation by Barium Carbonate followed by Filtration to include $BaCO_3$ to Frac Water ratio=2.5-10 g/L.

Another embodiment of this present invention includes a composition for the first ($1^{st}$) Processing Step—Metal Precipitation by Ferrous Sulfate followed by Filtration to include FeSO$_4$ to Frac Water ratio=45-70 g/L; the second (2$^{nd}$) Processing Step—Catalytic Oxidation at high pH followed by Filtration to include Catalyst to Frac Water ratio=240-270 g/L, H$_2$O$_2$ Concentration=1-1.5 M Solution, Catalyst to H$_2$O$_2$ (100%) ratio=5.3-7.5 g/g, and NaOH to Frac Water ratio=45-60 g/L; and the third (3$^{rd}$) Processing Step—Sulfates Precipitation by Barium Carbonate followed by Filtration to include BaCO$_3$ to Frac Water ratio=3-3.5 g/L.

Yet another embodiment of this present invention (see Table XIV) includes a composition for the first (1$^{st}$) Processing Step—Metal Precipitation by Ferrous Sulfate followed by Filtration to include FeSO$_4$ to Frac Water ratio=48.66 g/L; the second (2$^{nd}$) Processing Step—Catalytic Oxidation at high pH followed by Filtration to include Catalyst to Frac Water ratio=250 g/L, H$_2$O$_2$ Concentration=0.97 M Solution, Catalyst to H$_2$O$_2$ (100%) ratio=7 g/g, and NaOH to Frac Water ratio=52.63 g/L; and the third (3$^{rd}$) Processing Step—Sulfates Precipitation by Barium Carbonate followed by Filtration to include BaCO$_3$ to Frac Water ratio=3.3 g/L.

Experimental trials of this embodiment of the present invention (three-steps process) are conducted in the experimental trials 13, 14, 15, and 16 and presented in Tables XIII, XIV, XV, and XVI, respectively.'

Experimental Trial 13

First (1$^{st}$) Processing Step—Metal Precipitation by Ferrous Sulfate Followed by Filtration:
1. Volume of Frac Water (D)=1,500 mL
2. Reaction time ($\tau$)=30 min (0.5 hour)
3. Filtered Sludge (R)=290 gm
4. Treated Frac Water (Q)=1,300 mL Second (2$^{nd}$) Processing Step—Catalytic Oxidation at High pH Followed by Filtration:
1. Vol. of Treated Frac Water (Q) from 1$^{st}$ process. step=570 mL
2. Reaction time ($\tau$)=50 min (0.83 hour)
3. Catalytic Metal Sludge (S)=220 gm
4. Treated Frac Water (U)=510 mL Note: In this unit operation, 570 mL was used from Treated Frac Water Q. The remaining water was used for water testing.

See Table XIII below for the Experiment Trial 13 Results:

| | | Analyte Concentration (mg/L or ppm) | | | | Analyte Removal (%) | | |
|---|---|---|---|---|---|---|---|---|
| | | 1$^{st}$ Processing Step FeSO$_4$ to Frac Water ratio = 66.62 g/L | 2$^{nd}$ Processing Step Catalyst to Frac Water ratio = 250 g/L H$_2$O$_2$ conc. = 0.97M solution Catalyst to H$_2$O$_2$ (100%) ratio =7 g/g NaOH to Frac Water ratio = 52.63 g/L | | Treated | | | |
| Sr. No. | Analyte | Untreated Frac Water (D) | Treated Frac Water (Step 2) (Q) | Diluted Concentration (Step 1) (Y) * | Frac Water (Step 2) (U) | Step 1 = $\frac{D-Q}{D} \times 100$ | Step 2 = $\frac{Y-U}{Y} \times 100$ | Total** = $\frac{D-U}{U} \times 100$ |
| 1. | pH | 3.84 | 1.98 | — | 11.84 | — | — | — |
| 2. | Calcium | 13,800 | 2,760 | 2,549 | 7 | 80 | 100 | 100 |
| 3. | Iron | 103 | 18,400 | 16,994 | 0.25 | −17,764 | 100 | 100 |
| 4. | Barium | 451 | 0.013 | 0.012 | 0.018 | 100 | −50 | 100 |
| 5. | Strontium | 2,690 | 732 | 676 | 7 | 73 | 99 | 100 |
| 6. | Hardness | 38,231 | 10,303 | 9,515 | 18 | 73 | 100 | 100 |
| 7. | Sulfate | 109 | 3,870 | 3,574 | 3,740 | −3,450 | −5 | −3,593 |
| 8. | Zinc | 0.57 | 2.60 | 2.40 | 6.5 | −356 | −171 | −1,128 |
| 9. | TSS | 1,020 | 130 | 120 | 75 | 87 | 38 | 92 |
| 10. | Potassium | 3,440 | 3,040 | 2,808 | 3,720 | 12 | −32 | −16 |
| 11. | Magnesium | 910 | 830 | 767 | 0.21 | 9 | 100 | 100 |
| 12. | Chloride | 145,000 | 105,000 | 96,974 | 100,000 | 28 | −3 | 26 |
| 13. | Lithium | 100 | 95 | 88 | 71 | 5 | 19 | 24 |
| 14. | TDS | 205,000 | 156,000 | 144,075 | 146,000 | 24 | −1 | 23 |
| 15. | Sodium | 46,900 | 42,400 | 39,159 | 61,300 | 10 | −57 | −41 |

* In the 2$^{nd}$ processing step, adding H$_2$O$_2$ resulted in a 7.644% dilution factor.
**In calculating total % removal, 7.644% dilution factor taken into consideration. (e.g., TDS Concentration of Treated Frac Water (Step 2) (U) after considering a 7.644% dilution factor = 157,160 mg/L. So, Total % TSS removal = ((205,000 − 157,160)/205,000) × 100 ≅ 23%)

Experimental Trial 14

First (1$^{st}$) Processing Step—Metal Precipitation by Ferrous Sulfate Followed by Filtration:
1. Volume of Frac Water (D)=1,500 mL
2. Reaction time ($\tau$)=30 min (0.5 hour)
3. Filtered Sludge (R)=286 gm
4. Treated Frac Water (Q)=1,275 mL Second (2$^{nd}$) Processing Step—Catalytic Oxidation at High pH Followed by Filtration:
1. Volume of Treated Frac Water (Q) from 1$^{st}$ processing step=570 mL
2. Reaction time ($\tau$)=50 min (0.83 hour)
3. Catalytic Metal Sludge (S)=286 gm
4. Treated Frac Water (U)=500 mL See Table XIV below for the Experiment Trial 14 Results:

Note: In this unit operation, 570 mL was used from Treated Frac Water (Q). The remaining water was used for water testing.

TABLE XIV

| | | 1st Processing Step FeSO4 to Frac Water ratio = 48.66 g/L | | 2nd Processing Step Catalyst to Frac Water ratio = 250 g/L H2O2 conc. = 0.97M solution Catalyst to H2O2 (100%) ratio = 7 g/g NaOH to Frac Water ratio = 52.63 g/L | | Analyte Removal (%) | | |
|---|---|---|---|---|---|---|---|---|
| Sr. No. | Analyte | Untreated Frac Water (D) | Treated Frac Water (Step 1) (Q) | Diluted Concentration (Step 1) (Y) * | Treated Frac Water (Step 2) (U) | Step 1 = $\frac{D-Q}{D} \times 100$ | Step 2 = $\frac{Y-U}{Y} \times 100$ | Total** = $\frac{D-U}{U} \times 100$ |
| 1. | pH | 3.71 | 2.32 | — | 12.36 | — | — | — |
| 2. | Calcium | 13,800 | 4,010 | 3,703 | 6 | 71 | 100 | 100 |
| 3. | Iron | 103 | 11,800 | 10,898 | ND | −11,356 | 100 | 100 |
| 4. | Barium | 451 | 0.038 | 0.035 | 0.094 | 100 | −168 | 100 |
| 5. | Strontium | 2,690 | 831 | 767 | 15 | 69 | 98 | 99 |
| 6. | Hardness | 38,231 | 13,116 | 12,114 | 17 | 66 | 100 | 100 |
| 7. | Sulfate | 109 | 2,420 | 2,235 | 2,430 | −2,120 | −9 | −2,300 |
| 8. | Zinc | 0.57 | 1.50 | 1.40 | 33.2 | −163 | −2,297 | −6,170 |
| 9. | TSS | 1,020 | 212 | 196 | 211 | 79 | −8 | 78 |
| 10. | Potassium | 3,440 | 1,960 | 1,810 | 2,150 | 43 | −19 | 33 |
| 11. | Magnesium | 910 | 754 | 696 | 0.75 | 17 | 100 | 100 |
| 12. | Chloride | 145,000 | 114,000 | 105,285 | 101,000 | 21 | 4 | 25 |
| 13. | Lithium | 100 | 91 | 84 | 77 | 9 | 9 | 17 |
| 14. | TDS | 205,000 | 172,000 | 158,852 | 183,000 | 16 | −15 | 4 |
| 15. | Sodium | 46,900 | 36,400 | 33,617 | 60,800 | 22 | −81 | −40 |

* In the 2nd processing step, adding H2O2 resulted in a 7.644% dilution factor.
**In calculating total % removal, 7.644% dilution factor taken into consideration. (e.g., TDS Concentration of Treated Frac Water (Step 2) (U) after considering a 7.644% dilution factor = 108,720 mg/L. So, Total % TSS removal = ((145,000 − 108,720)/145,000) × 100 ≅ 25%)

Experimental Trial 15

First (1st) Processing Step—Metal Precipitation by Ferrous Sulfate Followed by Filtration:
1. Volume of Frac Water (D)=1,500 mL
2. Reaction time (τ)=30 min (0.5 hour)
3. Filtered Sludge (R)=94 gm
4. Treated Frac Water (Q)=1,410 mL Second (2nd) Processing Step—Catalytic Oxidation at High pH Followed by Filtration:
1. Volume of Treated Frac Water (Q) from 1st processing step=570 mL
2. Reaction time (τ)=34 min (0.56 hour)
3. Catalytic Metal Sludge (S)=100 gm
4. Treated Frac Water (U)=490 mL Note: In this unit operation, 570 mL was used from Treated Frac Water (Q). The remaining water was used for water testing.

See Table XV below for the Experiment Trial 15 Results:

| | | 1st Processing Step FeSO4 to Frac Water ratio = 4.86 g/L | | 2nd Processing Step Catalyst to Frac Water ratio = 25 g/L H2O2 conc. = 0.1M solution Catalyst to H2O2 (100%) ratio = 7 g/g NaOH to Frac Water ratio = 15.78 g/L | | Analyte Removal (%) | | |
|---|---|---|---|---|---|---|---|---|
| Sr. No. | Analyte | Untreated Frac Water (D) | Treated Frac Water (Step 1) (Q) | Diluted Concentration (Step 1) (Y) * | Treated Frac Water (Step 2) (U) | Step 1 = $\frac{D-Q}{D} \times 100$ | Step 2 = $\frac{Y-U}{Y} \times 100$ | Total = $\frac{D-U}{U} \times 100$ |
| 1. | pH | 3.64 | 2.98 | — | 11.17 | — | — | — |
| 2. | Calcium | 13,800 | 10,200 | 10,116 | 7,670 | 26 | 24 | 44 |
| 3. | Iron | 103 | 963 | 955 | ND | −835 | 100 | 100 |
| 4. | Barium | 451 | 0.94 | 0.93 | 1.3 | 100 | −39 | 100 |
| 5. | Strontium | 2,690 | 1,800 | 1,785 | 1,940 | 33 | −9 | 27 |
| 6. | Hardness | 38,231 | 28,382 | 28,149 | 19,380 | 26 | 31 | 49 |
| 7. | Sulfate | 109 | 1,280 | 1,269 | 1,110 | −1074 | 13 | −927 |
| 8. | Zinc | 0.570 | 0.560 | 0.555 | 0.20 | 2 | 64 | 65 |
| 9. | TSS | 1,020 | 31 | 31 | 58 | 97 | −86 | 94 |

-continued

| | | Analyte Concentration (mg/L or ppm) | | | | | |
|---|---|---|---|---|---|---|---|
| | | 1st Processing Step FeSO$_4$ to Frac Water ratio = 4.86 g/L | | 2nd Processing Step Catalyst to Frac Water ratio = 25 g/L H$_2$O$_2$ conc. = 0.1M solution Catalyst to H$_2$O$_2$ (100%) ratio = 7 g/g NaOH to Frac Water ratio = 15.78 g/L | | Analyte Removal (%) | | |
| Sr. No. | Analyte | Untreated Frac Water (D) | Treated Frac Water (Step 1) (Q) | Diluted Concentration (Step 1) (Y) * | Treated Frac Water (Step 2) (U) | Step 1 = $\frac{D-Q}{D} \times 100$ | Step 2 = $\frac{Y-U}{Y} \times 100$ | Total = $\frac{D-U}{U} \times 100$ |
| 10. | Potassium | 3,440 | 1,760 | 1,746 | 2,060 | 49 | −18 | 40 |
| 11. | Magnesium | 910 | 703 | 697 | 50 | 23 | 93 | 94 |
| 12. | Chloride | 145,000 | 131,000 | 129,924 | 117,000 | 10 | 10 | 19 |
| 13. | Lithium | 100 | 77 | 76 | 85 | 23 | −11 | 14 |
| 14. | TDS | 205,000 | 196,000 | 194,391 | 195,000 | 4 | −0.31 | 4 |
| 15. | Sodium | 46,900 | 36,300 | 36,002 | 49,400 | 23 | −37 | −6 |

* In the 2nd processing step, adding H$_2$O$_2$ resulted in a 0.82% dilution factor.
** In calculating total % removal, 0.82% dilution factor taken into consideration. (e.g., TDS Concentration of Treated Frac Water (Step 2) (U) after considering a 0.82% dilution factor = 196,599 mg/L. So, Total % TSS removal = ((205,000 − 196,599)/205,000) × 100 ≅ 4%)

Experimental Trial 16

First (1st) Processing Step—Metal Precipitation by Ferrous Sulfate Followed by Filtration 1. Volume of Frac Water (D)=1,500 mL
2. Reaction time ($\tau$)=30 min (0.5 hour)
3. Filtered Sludge (R)=19 gm
4. Treated Frac Water (Q)=1,450 mL Second (2nd) Processing Step—Catalytic Oxidation at High pH Followed by Filtration:

1. Volume of Treated Frac Water (Q) from 1st processing step=1,000 mL
2. Reaction time ($\tau$)=38 min (0.63 hour)
3. Catalytic Metal Sludge (S)=157 gm
4. Treated Frac Water (U)=870 mL Note: In this unit operation, 570 mL was used from Treated Frac Water (Q). The remaining water was used for water testing.

See Table XVI below for the Experiment Trial 16 Results:

TABLE XVI

| | | Analyte Concentration (mg/L or ppm) | | | | | |
|---|---|---|---|---|---|---|---|
| | | 1st Processing Step FeSO$_4$ to Frac Water ratio = 4.86 g/L | | 2nd Processing Step Catalyst to Frac Water ratio = 25 g/L H$_2$O$_2$ conc. = 0.1M solution Catalyst to H$_2$O$_2$ (100%) ratio = 7 g/g NaOH to Frac Water ratio = 8 g/L | | Analyte Removal (%) | | |
| Sr. No. | Analyte | Untreated Frac Water (D) | Treated Frac Water (Step 1) (Q) | Diluted Concentration (Step 1) (Y) * | Treated Frac Water (Step 2) (U) | Step 1 = $\frac{D-Q}{D} \times 100$ | Step 2 = $\frac{Y-U}{Y} \times 100$ | Total = $\frac{D-U}{U} \times 100$ |
| 1. | pH | 4.09 | 5.64 | — | 11.22 | — | — | — |
| 2. | Calcium | 6,900 | 6,100 | 6,050 | 5,300 | 12 | 12 | 23 |
| 3. | Iron | 22 | 1,700 | 1,686 | 1.2 | −7,627 | 100 | 95 |
| 4. | Barium | 740 | 0.35 | 0.35 | 0.19 | 100 | 45 | 100 |
| 5. | Strontium | 1,500 | 1,200 | 1190 | 1,100 | 20 | 8 | 26 |
| 6. | Hardness | 19,915 | 17,587 | 17,443 | 17,299 | 12 | 1 | 12 |
| 7. | Sulfate | 360 | 2,000 | 1,984 | 1,500 | −456 | 24 | −320 |
| 8. | Zinc | 0.25 | 0.59 | 0.59 | 0.25 | −136 | 57 | −1 |
| 9. | TSS | 140 | 20 | 20 | 110 | 86 | −455 | 21 |
| 10. | Potassium | 690 | 600 | 595 | 710 | 13 | −19 | −4 |
| 11. | Magnesium | 650 | 570 | 565 | 2.1 | 12 | 100 | 100 |
| 12. | Chloride | 59,000 | 61,000 | 60,499 | 57,000 | −3 | 6 | 3 |
| 13. | Lithium | 49 | 44 | 44 | 49 | 10 | −12 | −1 |

TABLE XVI-continued

| | | Analyte Concentration (mg/L or ppm) | | | Analyte Removal (%) | | |
|---|---|---|---|---|---|---|---|
| | | 1st Processing Step FeSO4 to Frac Water ratio = 4.86 g/L | 2nd Processing Step Catalyst to Frac Water ratio = 25 g/L $H_2O_2$ conc. = 0.1M solution Catalyst to $H_2O_2$ (100%) ratio = 7 g/g NaOH to Frac Water ratio = 8 g/L | | | | |
| Sr. No. | Analyte | Untreated Frac Water (D) | Treated Frac Water (Step 1) (Q) | Diluted Concentration (Step 1) (Y) * | Treated Frac Water (Step 2) (U) | Step 1 = $\frac{D-Q}{D} \times 100$ | Step 2 = $\frac{Y-U}{Y} \times 100$ | Total = $\frac{D-U}{U} \times 100$ |
| 14. | TDS | 110,000 | 85,000 | 84,302 | 97,000 | 23 | −15 | 11 |
| 15. | Sodium | 26,000 | 24,000 | 23,803 | 32,000 | 8 | −34 | −24 |

* In the 2nd processing step, adding $H_2O_2$ resulted in a 0.82% dilution factor.
** In calculating total % removal, 0.82% dilution factor taken into consideration. (e.g., TDS Concentration of Treated Frac Water (Step 2) (U) after considering a 0.82% dilution factor = 97,795 mg/L. So, Total % TSS removal = ((110,000 − 97,795)/110,000) × 100 ≈ 11%

In summary, based on the above experimental trials conducted, the minimum % reduction of analytes achieved in FIG. 1 (Innovative Process 1), FIG. 4 (Innovative Process 2), and FIG. 5 (Innovative Process 3) is shown in the below Table D.

| Sr. No. | Minimum % Reduction of Analyte | Cosmos Innovative Process 1 (FIG. 1) | Cosmos Innovative Process 2 (FIG. 4) | Cosmos Innovative Process 3 (FIG. 5) |
|---|---|---|---|---|
| 1. | Iron | 95 | 95 | 95 |
| 2. | Calcium | 95 | — | 95 |
| 3. | Barium | 90 | 45 | 95 |
| 4. | Strontium | 75 | — | 95 |
| 5. | Magnesium | 35 | — | 95 |
| 6. | TSS | 85 | — | 75 |
| 7. | Hardness | 85 | — | 95 |

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents

What is claimed is:

1. A method of treating wastewater for the removal of metals from the wastewater, the method comprising steps of:
   adding the wastewater, dried Basic Oxygen Furnace (BOF) slag, and hydrogen peroxide ($H_2O_2$) to a Catalytic Oxidation reactor unit and stirring to create a first catalytic metal slurry, wherein soluble metals in solution are absorbed onto a surface of the BOF slag;
   transferring the first catalytic metal slurry to a first separation unit and subjecting the first catalytic metal slurry to a first solid-liquid separation process to create (i) a first treated wastewater and (ii) a catalytic metal sludge;
   transferring the first treated wastewater to a metal precipitation unit;
   adding a Carbonate to the metal precipitation unit and stirring to create a carbonate metal slurry; and
   transferring the carbonate metal slurry to a second separation unit and subjecting the carbonate metal slurry to a second solid-liquid separation process to create (i) a second treated wastewater and (ii) a filtered sludge,
   wherein the second treated wastewater contains less metals than the wastewater and is reusable for an industrial operation.

2. The method according to claim 1, further comprising steps of:
   transferring the first treated wastewater to a metal desorption unit before the step of metal precipitation according to claim 1;
   adding de-ionized DI water to the first treated wastewater in the metal desorption unit and stirring to create a barium/iron rich slurry;
   transferring the barium/iron rich slurry to an intermediate separation unit and subjecting the barium/iron slurry to an intermediate solid-liquid separation process to create (i) a filtered water containing Barium and Iron and (ii) a wet BOF Slag; and
   transferring the filtered water containing Barium and Iron to the metal precipitation unit for precipitation of the filtered water containing Barium and Iron according to the step of metal precipitation of claim 1.

3. The method according to claim 1, wherein the step of adding the wastewater, dried Basic Oxygen Furnace (BOF) slag, and hydrogen peroxide ($H_2O_2$) to a Catalytic Oxidation reactor unit comprises:
   adding a Dried Basic Oxygen Furnace (BOF) slag to wastewater ratio=1-300 g/L;
   adding a $H_2O_2$ Concentration=0.1-2M solution, and
   adding a Dried Basic Oxygen Furnace (BOF) slag to $H_2O_2$ (100%) ratio=0.25-7 g/g.

4. The method according to claim 1, wherein the step of adding a Carbonate to the metal precipitation unit comprises adding a Carbonate to wastewater ratio=1-100 g/L.

5. The method according to claim 4, wherein the Carbonate is $Na_2CO_3$.

6. The method according to claim 1, wherein the step of adding the wastewater, dried Basic Oxygen Furnace (BOF) slag, and hydrogen peroxide ($H_2O_2$) to a Catalytic Oxidation reactor unit comprises:
   adding a Dried Basic Oxygen Furnace (BOF) slag to wastewater ratio=20-30 g/L;

adding a $H_2O_2$ Concentration=3-7M solution, and adding a Dried Basic Oxygen Furnace (BOF) slag to $H_2O_2$ (100%) ratio=5.3-7.5 g/g.

7. The method according to claim 1, wherein the step of adding the Carbonate to the metal precipitation unit comprises adding a Carbonate to wastewater ratio=40-45 g/L.

8. The method according to claim 4, wherein the Carbonate is $Na_2CO_3$.

9. The method according to claim 1, wherein the step of adding the wastewater, dried Basic Oxygen Furnace (BOF) slag, and hydrogen peroxide ($H_2O_2$) to a Catalytic Oxidation reactor unit comprises:

adding a Dried Basic Oxygen Furnace (BOF) slag to wastewater ratio=25 g/L;

adding a $H_2O_2$ Concentration=0.1M solution, and adding a Dried Basic Oxygen Furnace (BOF) slag to $H_2O_2$ (100%) ratio=7 g/g.

10. The method according to claim 1, wherein the step of adding the Carbonate to the metal precipitation unit comprises adding a Carbonate to wastewater ratio=43.22 g/L.

11. The method according to claim 4, wherein the Carbonate is $Na_2CO_3$.

12. The method according to claim 2, wherein the step of adding the wastewater, dried Basic Oxygen Furnace (BOF) slag, and hydrogen peroxide ($H_2O_2$) to a Catalytic Oxidation reactor unit comprises:

adding a Dried Basic Oxygen Furnace (BOF) slag to wastewater ratio=250 g/L;

adding a $H_2O_2$ Concentration=1.35M solution, and adding a Dried Basic Oxygen Furnace (BOF) slag to $H_2O_2$ (100%) ratio=3 g/g.

13. The method according to claim 2, wherein the step of adding de-ionized DI water comprises adding a De-ionized DI water to the Catalyst Metal Sludge ratio=0.25-2 mL/g.

14. The method according to claim 1, wherein the second treated wastewater contains at least 95% less Iron than the wastewater.

15. The method according to claim 1, wherein the second treated wastewater contains at least 95% less Calcium than the wastewater.

16. The method according to claim 1, wherein the second treated wastewater contains at least 90% less Barium than the wastewater.

17. The method according to claim 1, wherein the second treated wastewater contains at least 75% less Strontium than the wastewater.

18. The method according to claim 1, wherein the second treated wastewater contains at least 35% less Magnesium than the wastewater.

19. The method according to claim 1, wherein the second treated wastewater contains at least 85% less Total Suspended Solids than the wastewater.

20. The method according to claim 1, wherein the second treated wastewater contains at least 85% less Hardness than the wastewater.

21. The method according to claim 2, wherein the second treated wastewater contains at least 95% less Iron than the wastewater.

22. The method according to claim 2, wherein the second treated wastewater contains at least 45% less Barium than the wastewater.

23. The method according to claim 1, wherein the second treated wastewater contains at least 95% less Iron, at least 95% less Calcium, at least 90% less Barium, at least 75% less Strontium, at least 35% less Magnesium, at least 85% less Total Suspended Solids, and at least 85% less Hardness than the wastewater.

24. The method according to claim 2, wherein the second treated wastewater contains at least 95% less Iron and at least 45% less Barium than the wastewater.

25. A method of treating wastewater for the removal of metals from the wastewater, the method comprising steps of:

adding the wastewater and Ferrous Sulfate ($FeSO_4$) to a metal precipitation unit and stirring to create a metal sulfate slurry;

transferring the metal sulfate slurry to a first separation unit and subjecting the metal sulfate slurry to a first solid-liquid separation process to create a first treated wastewater and a filtered sludge;

transferring the first treated wastewater to a Catalytic Oxidation reactor unit;

adding Dried Basic Oxygen Furnace (BOF) slag, Hydroxides, hydrogen peroxide ($H_2O_2$) to the Catalytic Oxidation reactor unit and stirring to create a catalytic metal slurry;

transferring the catalytic metal slurry to a second separation unit and subjecting the catalytic metal slurry to a solid-liquid separation process to create a second treated wastewater and a catalytic metal sludge, transferring the second treated wastewater to a sulfates precipitation unit;

adding Barium Carbonate ($BaCO_3$) to the sulfates precipitation unit and stirring to create a barium sulfate slurry;

transferring the barium sulfate slurry to a third separation unit and subjecting the barium sulfate slurry to the solid-liquid separation process to create a third treated wastewater and a filtered sludge, wherein the third treated wastewater contains less metals than the wastewater and is reusable for an industrial operation.

26. The method according to claim 25, wherein the Hydroxides is NaOH.

27. The method according to claim 25, wherein the step of adding the wastewater and Ferrous Sulfate ($FeSO_4$) to a metal precipitation unit comprises adding a $FeSO_4$ to wastewater ratio=2-120 g/L.

28. The method according to claim 25, wherein the step of adding the wastewater and Ferrous Sulfate ($FeSO_4$) to a metal precipitation unit comprises adding a $FeSO_4$ to wastewater ratio=45-70 g/L.

29. The method according to claim 25, wherein the step of adding the wastewater and Ferrous Sulfate ($FeSO_4$) to a metal precipitation unit comprises adding a $FeSO_4$ to wastewater ratio=48.66 g/L.

30. The method according to claim 25, wherein the step of adding Dried Basic Oxygen Furnace (BOF) slag, Hydroxides, hydrogen peroxide ($H_2O_2$) to the Catalytic Oxidation reactor unit comprises:

adding a Dried Basic Oxygen Furnace (BOF) slag to wastewater ratio=1-300 g/L, adding a $H_2O_2$ Concentration=0.1-2M solution, adding a Dried Basic Oxygen Furnace (BOF) slag to $H_2O_2$ (100%) ratio=0.25-7 g/g, and a Hydroxides to Wastewater ratio=5-100 g/L.

31. The method according to claim 25, wherein the step of adding Dried Basic Oxygen Furnace (BOF) slag, Hydroxides, hydrogen peroxide ($H_2O_2$) to the Catalytic Oxidation reactor unit comprises:

adding a Dried Basic Oxygen Furnace (BOF) slag to wastewater ratio=250 g/L, adding a $H_2O_2$ Concentration=0.97M solution, adding a Dried Basic Oxygen Furnace (BOF) slag to $H_2O_2$ (100%) ratio=7 g/g, and adding a Hydroxides to Wastewater ratio=52.63 g/L.

32. The method according to claim 25, wherein the step of adding Barium Carbonate ($BaCO_3$) to the sulfates precipitation unit comprises adding a $BaCO_3$ to Wastewater ratio=2.5-10 g/L.

33. The method according to claim 25, wherein the step of adding Barium Carbonate ($BaCO_3$) to the sulfates precipitation unit comprises adding a $BaCO_3$ to Wastewater ratio=3-3.5 g/L.

34. The method according to claim 25, wherein the step of adding Barium Carbonate ($BaCO_3$) to the sulfates precipitation unit comprises adding a $BaCO_3$ to Wastewater ratio=3.3 g/L.

35. The method according to claim 25, wherein the third treated wastewater contains at least 95% less Iron than the wastewater.

36. The method according to claim 25, wherein the third treated wastewater contains at least 95% less Calcium than the wastewater.

37. The method according to claim 25, wherein the third treated wastewater contains at least 95% less Barium than the wastewater.

38. The method according to claim 25, wherein the third treated wastewater contains at least 95% less Strontium than the wastewater.

39. The method according to claim 25, wherein the third treated wastewater contains at least 95% less Magnesium than the wastewater.

40. The method according to claim 25, wherein the third treated wastewater contains at least 75% less Total Suspended Solids than the wastewater.

41. The method according to claim 25, wherein the third treated wastewater contains at least 95% less Hardness than the wastewater.

42. The method according to claim 25, wherein the third treated wastewater contains at least 95% less Iron, at least 95% less Calcium, at least 95% less Barium, at least 95% less Strontium, at least 95% less Magnesium, at least 75% less Total Suspended Solids, and at least 95% less Hardness than the wastewater.

* * * * *